United States Patent [19]

Roffman

[11] Patent Number: 5,724,258
[45] Date of Patent: Mar. 3, 1998

[54] NEURAL NETWORK ANALYSIS FOR MULTIFOCAL CONTACT LENS DESIGN

[75] Inventor: Jeffrey H. Roffman, Jacksonville, Fla.

[73] Assignee: Johnson & Johnson Vision Products, Inc., Jacksonville, Fla.

[21] Appl. No.: 647,005

[22] Filed: May 9, 1996

[51] Int. Cl.$^6$ .............. G02C 7/04; B29D 11/00; A61F 2/16
[52] U.S. Cl. .............. 364/525; 364/524; 351/160 R; 351/160 H; 351/159; 395/21; 395/22; 395/23
[58] Field of Search .............. 364/524, 525; 395/20–23; 351/159, 160 H, 160 R, 177, 168–169, 205, 219; 359/558, 565, 570, 571, 628

[56] References Cited

U.S. PATENT DOCUMENTS

| | | | |
|---|---|---|---|
| 4,869,587 | 9/1989 | Breger | 351/161 |
| 5,112,351 | 5/1992 | Christie et al. | 623/6 |
| 5,198,844 | 3/1993 | Roffman et al. | 351/161 |
| 5,225,858 | 7/1993 | Portney | 351/161 |
| 5,296,881 | 3/1994 | Freeman | 351/177 |
| 5,404,183 | 4/1995 | Roffman et al. | 351/161 |
| 5,430,506 | 7/1995 | Volk | 359/708 |
| 5,493,350 | 2/1996 | Seidner | 351/161 |
| 5,517,260 | 5/1996 | Glady et al. | 351/169 |
| 5,526,071 | 6/1996 | Seidner et al. | 351/161 |
| 5,619,289 | 4/1997 | Seidner et al. | 351/161 |

FOREIGN PATENT DOCUMENTS

| | | | |
|---|---|---|---|
| 1316025 | 11/1984 | Canada | G02C 7/06 |
| 00201231A2 | 11/1986 | European Pat. Off. | G02C 7/04 |
| 00295849A2 | 12/1988 | European Pat. Off. | G02C 7/02 |
| 00295849A3 | 12/1988 | European Pat. Off. | G02C 7/02 |
| 00351471A2 | 1/1990 | European Pat. Off. | G02C 7/04 |
| 00351471A3 | 1/1990 | European Pat. Off. | G02C 7/06 |
| 02688898A | 9/1993 | France | G02C 7/04 |
| WO 87007496A1 | 5/1986 | WIPO | A61F 2/16 |
| WO 08603961A1 | 7/1986 | WIPO | G02C 7/04 |
| WO 08700299A1 | 1/1987 | WIPO | G02C 7/06 |

OTHER PUBLICATIONS

Larry Bickford, The EyeCare Reports—Treatment of Presbyopia using multifocal contact lenses, pp. 1–5, 1995.
Larry Bickford, The EyeCare Connection—Specialty Lenes: Multi-Focal Contact Lenses, pp. 1–4, 1995.

*Primary Examiner*—James P. Trammell
*Assistant Examiner*—Cuong H. Nguyen

[57] ABSTRACT

The present invention discloses a method for optimizing multifocal lens designs using neural network analysis. More specifically, a neural network is trained using data collected in clinical evaluations of various multifocal lens designs. The trained neural network is then used to predict optimal lens designs for large populations of patients.

40 Claims, 10 Drawing Sheets

NEURAL NETWORK ANALYSIS FOR MULTIFOCAL CONTACT LENS DESIGN

BACKGROUND OF THE INVENTION

This invention generally relates to multifocal opthamalic lens designs, and more particularly to a method for determining optimal designs for multifocal opthamalic lenses using neural network analysis.

The ability of an individual's eyes to focus on objects may be affected by various optical refractive conditions including presbyopia and cataracts. To elaborate, each eye contains a natural lens that is used to focus images on the retina of the eye. In a person with normal eyesight, the lens of the eye is naturally shaped to focus images of distant objects on the retina, and the eye lens is bent in order to focus images of near objects on the retina. This adjustment of the eye lens to focus images of objects on the retina is referred to as accommodation.

With many people the accommodation of the eyes is inadequate. For example, as a person ages the natural crystalline lenses of the eyes tend to harden. The hardening makes it difficult for the eye lens to change its surface curvature (i.e. bending). This inability of the eye lens to bend is a condition referred to as presbyopia. Presbyopia can be corrected with prescribed optical lenses.

Inadequate accommodation may also be caused by cataracts. Many people with cataracts have their natural eye lenses removed and replaced with artificial intraocular lenses which have no ability to change or adjust inside the eye. People with this condition require corrective lenses to compensate for their optical condition.

Inadequate accommodation may be corrected by spectacles or other lenses having a number of different regions with different optical powers. A person wearing spectacles must shift his or her line of vision so that the object being viewed is observed through a portion of the spectacle having the appropriate optical power. An alternative to spectacles is opthamalic contact lenses with multifocal capabilities. Multifocal contact lenses provide the wearer with the ability to focus on objects at both near and far distances without changing their line of vision.

Specific multifocal lens designs have a circular inner region surrounded by a plurality of concentric annular rings having alternating optical power. The lens is divided into two or more regions, including the circular inner region, having various optical power distributions. Each region, other than the circular inner region, may contain one or more annular rings.

A preferred multifocal lens design for the correction of presbyopia separates the lens into three regions: a circular inner region; an annular intermediate region consisting of multiple annular rings having alternating optical powers; and an annular outer region. This preferred design is described in detail in copending application Ser. No. 08/434,933, filed on May 4, 1995 which is hereby incorporated by reference.

In the preferred design, the inner region has distance optical corrective power. The inner region is most important in conditions of high luminance when the pupil of the eye is constricted to limit the amount of light that enters the eye. When the pupil is constricted the effective corrective coverage area of the multifocal lens is the inner region. High luminance conditions, when the pupil is constricted, usually occur in outdoor daylight activities which require distance vision correction. Thus, it is advantageous to design multifocal lenses with distance optical power correction in the inner region.

In the preferred design, the intermediate region has both near and distance optical corrective powers. The intermediate region is most important in conditions of intermediate luminance when the pupil is in the middle of its dilation range. When the pupil is in the middle of its dilation range the boundary of the effective corrective coverage area of the multifocal lens is the intermediate region. intermediate luminance conditions, when the pupil is in the middle of its dilation range, can occur indoors under artificial light, or outdoors on cloudy days or at dusk. Activities under such conditions can range from reading a book, which requires near vision correction, to driving a vehicle, which requires distance vision correction. Thus, it is advantageous to design multifocal lenses with an intermediate region having both near and distance optical corrective power.

In the preferred design, the outer region is designed to have distance optical corrective power. The outer region is most important in conditions of low luminance when the pupil of the eye is fully dilated. When the pupil is fully dilated the boundary of the effective corrective coverage area of the multifocal lens is the outer region. Low luminance conditions, when the pupil is fully dilated, can occur outdoors at night. Nighttime activities usually include driving a vehicle or walking down a street which require distance vision correction. Thus, it is advantageous to design multifocal lenses with an outer region having distance optical corrective power.

The multifocal lens design set forth above is a preferred design for correction of presbyopia, however, other designs are possible which may perform as well or better. Optimal designs vary from patient to patient and are dependent upon individual patient parameters.

A recent development in fitting contact lenses is the molding of extended wear and daily wear lenses that are discarded when removed from the eye. This development requires a high volume automated facility to produce these disposable lenses at an acceptable cost/wear ratio. In this environment, it is impractical to keep small inventories of a large variety of multifocal lens designs that will accommodate small groups of patients. It is more desirable to keep larger inventories of a relatively smaller number of designs that will accommodate large groups of patients. Thus, it is necessary to find optimal designs that will provide proper vision correction for large populations of patients. A complicating factor in the design of lenses for large groups is that subjective performance evaluation does not always allow optimum optical correction. Finding optimal designs for large populations of patients is a primary objective of the present invention.

Designing optimal multifocal contact lenses for large groups of patients entails selecting optical design parameters based upon the common optical needs of the patients in the group. Relevant optical design parameters for fitting contact lenses to patients with presbyopia include, but are not limited to, the following: number of annular rings, spacing of annular rings, lens add power, monocular/binocular function, and pupil function. Each of the above-listed optical design parameters is described in the paragraphs that follow.

As previously detailed, multifocal contact lenses for treatment of presbyopia generally are comprised of a circular inner region surrounded by one or more annular regions having various optical power distributions. The optical power distribution of each region is defined by a parameter called pupil function. A near or distance optical power distribution indicates that a certain region is predominantly near or distance optical power, respectfully. An equal optical power distribution indicates that a region is comprised of an equal amount of near and distance optical power (i.e. the annular rings within a region are designed so that half of the total surface area of the region is near optical power and the other half is distance optical power).

Although multifocal lenses can be designed with a plurality of regions, practical designs usually have two or three regions with optical power distributions defined by the following pupil function types: distance/equal (d/q), wherein an inner region has distance optical power, and an outer region has an equal amount of near and distance optical power; distance/equal/distance (d/q/d), wherein an inner region has distance optical power, an intermediate region has an equal amount of near and distance optical power, and an outer region has distance optical power; or near/equal/distance (n/q/d), wherein an inner region has near optical power, an intermediate region has an equal amount of near and distance optical power, and an outer region has distance optical power.

Another optical design parameter to be considered when designing multifocal contact lenses is monocular/binocular function, which is relevant to multifocal lenses as a pair. Monocular/binocular function indicates whether each lens in a pair is identical or slightly different. Monocular designs are those in which both eyes are fitted with identical lens designs. Binocular designs are those in which each eye is fitted with a slightly different lens designs. Binocular designs usually fit the distance dominant eye with a lens which has a higher proportion of distance optical power than does the lens for the non-dominant eye.

Two very important optical design parameters of a multifocal lens are the number of and spacing between the annular rings that surround the circular inner region. These two parameters are a function of patient pupil size under different illumination conditions. They also are affected by the optical power distribution requirements of each region.

Another important optical design parameter is lens add power which sets the overall add power correction of the multifocal lens. Lens add power is a function of a patients optical corrective needs.

In addition to the optical design parameters discussed above, multifocal lens designs are dependent upon several patient parameters. Relevant patient parameters include, but are not limited to, the following: patient age, patient refractive add and patient Hloss.

As discussed above, the accommodation of a person's eyes diminishes with that person's age. In fact, with advanced age, a person may lose that ability altogether. For this reason alone it is important to consider patient age when designing multifocal contact lenses.

Patient age has additional relevance to multifocal lens designs. The manner in which the size of a person's pupil varies is predictable, principally depending on the illumination level and the age of the person. For people of the same age, the size of their pupils at maximum and minimum dilation change, as a function of illumination level, in the same or substantially the same way. Thus, the size of a person's pupils at minimum and maximum dilation can be estimated based upon the age of that person.

The size of a patient's pupil at different illumination levels affects the effective corrective power ratio of the lens. For example, if a patient is performing a distance vision task under high illumination, the patient's pupil is constricted and the effective corrective area of the multifocal lens is the inner region, which must provide distance vision correction. Thus, since the effective corrective power ratio of a multifocal lens is a function of patient pupil size, and patient pupil size, as a function of illumination, changes with patient age, it is important to consider patient age when designing multifocal lenses.

The inability to focus images that are relatively near (approximately 18 inches) is measured by the amount of positive optical power that must be added to an individual's base distance correction, if any, in order to enable the individual to focus the image properly. The positive optical power that is provided for this reason is typically referred to as refractive add. Multifocal lens designs that will accommodate large groups of patients require that all patients in the particular group have approximately the same refractive add requirement.

A patient's Hloss is a measurement of how many lines of visual acuity a subject loses when trying to perform near vision tasks with their distance Rx compared to their near Rx addition.

Actual clinical performance of specific lens designs are based upon clinical visual acuity measurements of patients while wearing the lenses. Visual acuity (VA) can be measured in units defined by $-10*$ LogMAR, where MAR is minimum angle of resolution. In this system 20/20 corresponds to 0.00, values better than 20/20 are positive values, and values poorer than 20/20 are negative values. VA also can be measured in lines lost from a best spectacle correction. Such measurements are based upon number of letters on a line, assuming an eye chart with eight letters on a line.

VA measurements can be taken for near and distance optical performance. VA can also be measured at high, low or intermediate levels of luminance and contrast.

VA performance of specific lens designs can be determined subjectively. Subjective determinations are based upon subjective ratings by individual patients after being fitted with different lens designs. A subjective rating may be based upon a patient's optical performance rating of a lens as defined by a number selected from a predetermined range.

In clinical evaluations, it was found that the optical performance of specific lens designs based upon actual VA measurements did not always coincide with subjective determinations. Thus, it was determined that evaluations of specific lens designs would be more accurate if based upon both actual and subjective VA determinations.

It is not cost effective to inventory large varieties of daily wear or extended wear disposable multifocal lenses having different designs to accommodate individual patients or small groups of patients. If the design is useful only to a small group of patients, then the costs expended to inventory the many different combinations of designs, powers and adds will not be easily recouped. Thus, it is advantageous to design multifocal lenses that will accommodate large populations of patients having similar optical needs.

Finding optimal lens designs that will accommodate large populations of patients is extremely difficult because there are a multitude of design variables to consider. These variables include the optical design parameters and patient parameters discussed above. A complicating factor is that the optical performance of a particular lens design when worn by a particular patient is not linearly related to the optical performance of the lens when worn by other patients. Thus, the relationship between lens design and optical performance is not linear and can not be modeled by a linear equation which could be used to determine optimal designs.

There is a need to formulate a method which can accurately model the relationship between various lens designs and the optical performances of those lenses. Such a model could then be used to determine optimal multifocal lens designs for large populations of patients.

SUMMARY OF THE INVENTION

An object of the present invention is to optimize multifocal lens designs for large populations of patients.

Another object of the present invention is to utilize neural network analysis to determine optimal multifocal lens designs for large populations of patients.

A further object of the present invention is to analyze initial fit Visual Acuity (VA) data collected from clinical studies of various multifocal lens designs and to optimize multifocal lens designs based upon those studies.

These and other objectives are achieved by utilizing a neural network to learn true relationships between various multifocal lens designs and their associated visual acuity performance.

Further benefits and advantages of the invention will become apparent from a consideration of the following detailed description which specifies a preferred embodiment of the invention.

DETAILED DESCRIPTION OF THE PREFERRED EMBODIMENT

Figure 1:
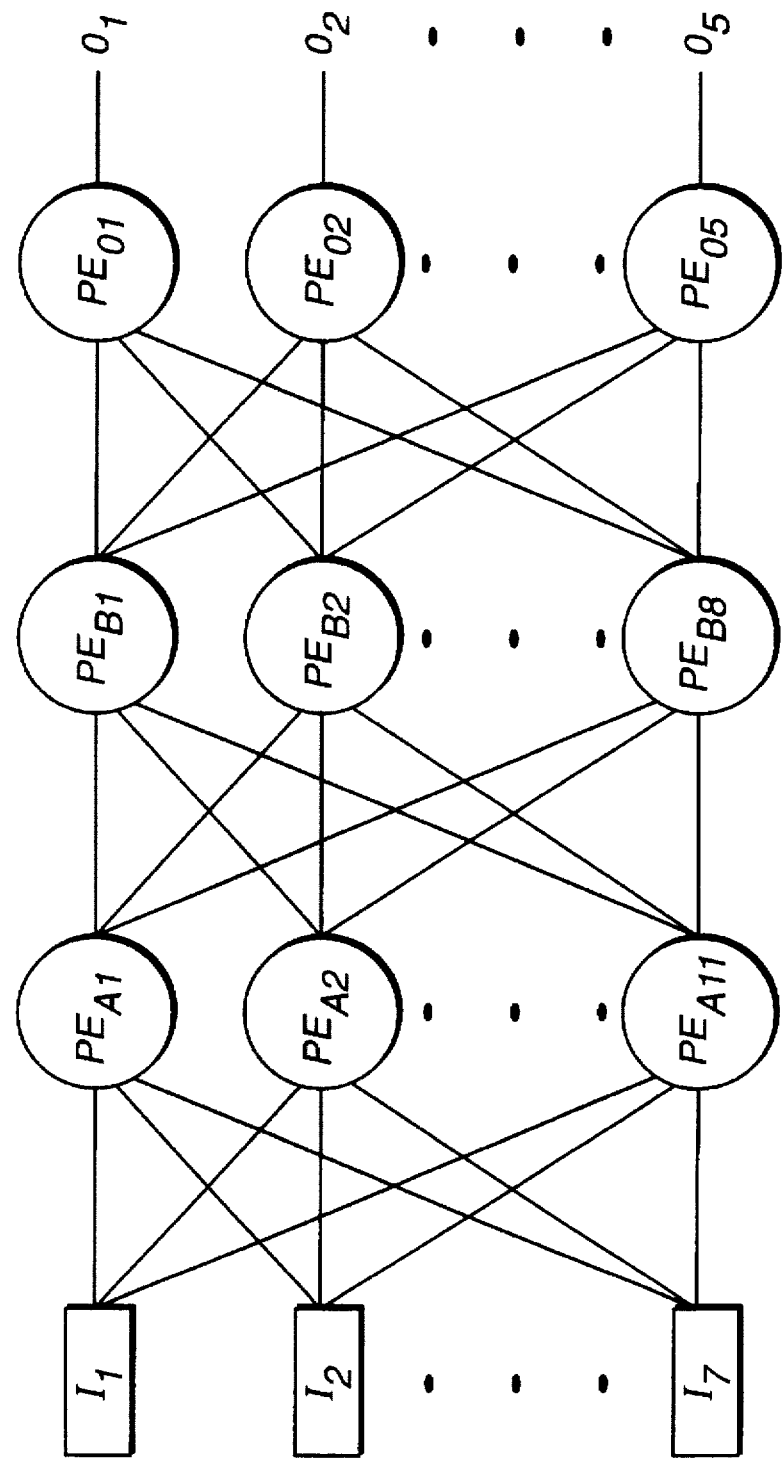
FIG. 1 shows the structure of a neural network.

Neural network analysis is a method of modeling non-linear relationships between independent and dependent variables. The analysis is performed by creating a neural network which accurately models the relationship between the independent and dependent variables. Once a valid neural network is created it can be used to predict values of unknown, dependent variables on the basis of known, independent variables. By convention, in neural network analysis, independent variables are called inputs and dependent variables are called outputs.

The power of a neural network is found in the non-linear equation that it uses to model the relationship between the inputs and the outputs. The equation is a complex function that is defined by a set of variables called connection weights. Connection weights are determined by a training algorithm which examines training data that is input into the neural network. The training data is a set of inputs and associated outputs that are representative of the nonlinear relationship being modeled. The training algorithm processes the training data and finds a set of weights that minimize the error between the predicted output of the neural network and the training data output.

A neural network is structurally comprised of an input layer, one or more hidden layers, and an output layer. The output and hidden layers are comprised of interconnected processing elements which are the main building blocks of a neural network.

The main function of the input layer is to route input values to processing elements of the first hidden layer. Each processing element multiplies each input by a different weight value and adds the individual products. The results are passed through a non-linear transfer function to produce a processing element output. All processing element outputs of one layer are routed to processing element inputs of the next layer where the same processing is repeated.

The last layer is the output layer which contains either linear or non-linear processing elements. Non-linear processing elements process inputs in the same manner described above. Linear processing elements simply pass the input of the processing element to the output of the processing element. The outputs of the processing elements in the output layer produce the final output of the neural network.

Other neural network design considerations include whether the neural network is a fully connected and/or a feedforward design. A neural network is fully connected if all outputs from one layer are used as inputs to the next layer. A neural network is feedforward if there are no internal feedback loops (i.e. no outputs from one layer are used as inputs to a previous layer).

The first step in creating a neural network is to define what is to be predicted. These predictions will be the outputs of the neural network. The next step is to identify all variables that could possibly influence the value of the predictions. These variables will be the inputs to the neural network. Once the inputs and outputs have been identified the remaining structure of the neural network, including the number of layers and the number of processing elements in each layer, must be determined.

Once the structure of the neural network is determined, the neural network can be created. After creation, the neural network is trained using training data. Training data is a set of data, including input variables and associated output variables, which represent the statistical relationship to be modeled by the neural network. The more training data collected and used the better, particularly if the relationship being modeled is statistical.

Training is accomplished by a training algorithm that is implemented by the neural network. The training algorithm processes the training data and selects appropriate connection weights which will most closely model the relationship between the training data inputs and the training data outputs.

After training, the performance of the neural network can be evaluated using test data. Test data is gathered in the same manner as training data, in fact, for superior test results, test data should consist of a random ten percent of the training data.

Testing a neural network is accomplished as follows. Test data inputs are individually input into the neural network. The neural network is run and predicted outputs are generated for each test input. The predicted outputs are compared to actual test data outputs to determine if the neural network is performing properly. A neural network that performs poorly on test data should not be used.

After a neural network is trained it can be used to predict outputs based on various inputs. A set of variables can be used as inputs and the neural network can be run to predict outputs based upon those inputs. The resulting predictions then can be used for the purpose for which the neural network was designed.

The present invention comprises a method which utilizes a neural network to predict optimal multifocal lens designs for large populations of patients. The neural network is used to model the non-linear relationship between various optical design parameters and the associated visual acuity performance of lenses formed using those design parameters. A detailed description of the inventive method is set forth below.

The first step is to identify optical design parameters that are relevant to a specific optical refractive condition. The identified optical design parameters then are used to form optical lenses that are used in clinical evaluations to derive visual acuity performance data for a defined number of patients having the specified optical refractive condition.

Next, a neural network is created using the identified optical design parameters and various patients parameters as inputs, and the visual acuity data as outputs. After creation, the neural network is trained using the data collected in the clinical evaluations.

After training, specific optical design parameters are isolated and evaluated by the trained neural network to predict visual acuity as a function of the specified parameters. The resulting visual acuity predictions are analyzed with reference to the specified design parameters and optimal lens designs are determined for large populations of patients having the optical refractive condition.

In an embodiment of the present inventive method a neural network is created using @BRAIN Neural Network Development System (NNDS) from Talon Development Corporation. The neural network is used to model a non-linear relationship between various optical design parameters and associated VA/subjective performance of lenses formed using those design parameters. The neural network comprises several layers including an input layer, an output layer and one or more hidden layers having interconnected processing elements that are used by a training algorithm to determine a set of connection weights that accurately model the relationship between the optical design parameters and the VA/subjective performance of the associated lenses. The @BRAIN NNDS utilizes Talon's training algorithm which defines each processing element as a sigmoid non-linear transfer function represented by the following equation:

$$out = 1.0/(1+e^{-in}) - 0.5.$$

Where out is the output of the processing element, in is the collective sum of each processing element input multiplied by its associated weight, and $e^{-in}$ is $1 \times 10^{-in}$.

In the present embodiment, a neural network was used to determine the optimal number of concentric annular rings for multifocal contact lenses designed for a large population of patients having presbyopia and requiring medium refractive add correction. Each step of the present embodiment of the disclosed inventive method is set forth below.

A first step was to identify optical design parameters for patients having presbyopia and requiring medium add correction. The optical design parameters included number of concentric annular rings, lens add power, pupil function, and monocular or binocular pair. Number of rings had a range from 1 to 12, lens add power had a value of either 1.5 or 2.0, pupil function was either distance/equal (d/q); distance/equal/distance (d/q/d); or near/equal/distance (n/q/d), and monocular or binocular pair was either monocular pair or binocular pair.

Various combinations of design parameters were selected and labeled with various design codes Each design code indicated a pair of multifocal contact lenses having the same optical design parameters. The various design codes and the associated design parameters were as follows: design code 103 was a monocular design having 12 rings, a lens add power of 1.5 and a pupil function of d/q; design code 104 was a monocular design having 7 rings, a lens add power of 1.5 and a pupil function of d/q/d; design code 105/6 was a binocular design having 6.5 rings, a lens add power of 1.5 and a pupil function of d/q; design code 107/8 was a binocular design having 6 rings, a lens add power of 1.5 and a pupil function of d/q/d; design code 109/10 was a binocular design having 3 rings, a lens add power of 1.5 and a pupil function of d/q/d; design code 111/12 was a binocular design having 4.5 rings, a lens add power of 1.5 and a pupil function of d/q; design code 113 was a monocular design having 5 rings, a lens add power of 1.5 and a pupil function of d/q/d; design code 114 was a monocular design having 6 rings, a lens add power of 1.5 and a pupil function of n/q/d; design code 203 was a monocular design having 12 rings, a lens add power of 2 and a pupil function of d/q; and design code 204 was a monocular design having 7 rings, a lens add power of 2 and a pupil function of d/q/d.

Next, multifocal contact lenses were formed using the specific design parameters in each design group. Patients were fitted with the lenses so formed, and clinical evaluations were performed to collect VA and subjective performance data for each lens design. For each patient wearing a specified design, actual VA for near and distance at high luminance and high contrast were measured in visual acuity units (v.a.u.) based upon a −10 Log MAR system. In addition, subjective response ratings for near, distance and overall lens performance were recorded for each patient based upon their satisfaction with the lens in question. Subjective response ratings were selected from a range between 0 and 50, where 50 was best spectacle correction and zero was no correction.

The optical design parameters and associated patient parameters were recorded in a spreadsheet along with the corresponding actual VA and subjective response data for each patient wearing each lens design. Patient parameters included patient age, patient refractive add and patient Hloss. The spreadsheet consisted of the data listed in Table I.

TABLE I

| design code | rand. train learn | no. of rings | lens add power | monc/ binoc mon = 1 bin = 2 | pupil d/q = 1 d/q/d = 2 n/q/d = 3 | age | add | Hloss | dist hi l hi c | near hi l hi c | dist. | near | overall |
|---|---|---|---|---|---|---|---|---|---|---|---|---|---|
| 103 | 0.709 | 12 | 1.5 | 1 | 1 | 40 | 1.00 | −0.4 | 1.20 | −0.2 | 38 | 38 | 38 |
| 103 | 0.888 | 12 | 1.5 | 1 | 1 | 44 | 1.50 | −2.0 | 1.40 | 0.2 | 23 | 40 | 32 |
| 103 | 0.715 | 12 | 1.5 | 1 | 1 | 42 | 1.50 | −3.0 | 2.00 | −0.4 | 46 | 34 | 40 |
| 103 | 0.511 | 12 | 1.5 | 1 | 1 | 46 | 1.75 | −2.6 | 1.00 | −1.2 | 40 | 40 | 40 |
| 103 | 0.377 | 12 | 1.5 | 1 | 1 | 53 | 1.75 | −2.2 | 1.00 | 0.0 | 46 | 49 | 48 |
| 103 | 0.088 | 12 | 1.5 | 1 | 1 | 48 | 2.00 | −3.4 | 1.00 | −0.2 | 36 | 50 | 42 |
| 103 | 0.161 | 12 | 1.5 | 1 | 1 | 53 | 2.00 | −4.0 | 0.80 | −1.8 | 50 | 25 | 38 |
| 103 | 0.179 | 12 | 1.5 | 1 | 1 | 53 | 2.00 | −3.8 | 1.00 | −2.8 | 49 | 41 | 45 |
| 103 | 0.161 | 12 | 1.5 | 1 | 1 | 50 | 2.25 | −3.6 | −1.20 | 0.4 | 38 | 44 | 41 |
| 103 | 0.718 | 12 | 1.5 | 1 | 1 | 51 | 2.25 | −6.4 | 0.60 | −1.2 | 50 | 50 | 50 |
| 103 | 0.119 | 12 | 1.5 | 1 | 1 | 48 | 1.00 | −0.0 | 0.50 | 1.2 | 40 | 19 | 35 |
| 103 | 0.221 | 12 | 1.5 | 1 | 1 | 46 | 1.00 | 0.0 | 0.13 | −1.4 | 37 | 37 | 37 |
| 103 | 0.359 | 12 | 1.5 | 1 | 1 | 45 | 1.00 | −0.6 | 2.63 | 1.0 | 9 | 44 | 46 |
| 103 | 0.861 | 12 | 1.5 | 1 | 1 | 49 | 1.25 | −1.2 | 1.00 | 0.0 | 0 | 36 | 30 |
| 103 | 0.418 | 12 | 1.5 | 1 | 1 | 53 | 1.50 | −3.0 | 1.50 | −0.8 | 50 | 50 | 50 |
| 103 | 0.366 | 12 | 1.5 | 1 | 1 | 50 | 1.50 | −3.2 | 1.75 | 1.0 | 45 | 40 | 42 |
| 103 | 0.758 | 12 | 1.5 | 1 | 1 | 60 | 1.50 | −2.6 | 0.50 | −1.2 | 1 | 9 | 10 |
| 103 | 0.923 | 12 | 1.5 | 1 | 1 | 50 | 1.50 | −2.4 | 1.00 | −0.6 | 40 | 45 | 45 |
| 103 | 0.760 | 12 | 1.5 | 1 | 1 | 52 | 1.50 | −6.8 | 1.00 | −1.0 | 35 | 15 | 15 |
| 103 | 0.938 | 12 | 1.5 | 1 | 1 | 53 | 1.75 | −6.4 | 1.13 | −3.0 | 50 | 10 | 35 |
| 103 | 0.571 | 12 | 1.5 | 1 | 1 | 54 | 1.75 | −3.0 | 1.88 | −0.8 | 37 | 16 | 24 |
| 103 | 0.226 | 12 | 1.5 | 1 | 1 | 52 | 1.75 | 04.4 | 0.75 | 0.6 | 45 | 37 | 40 |
| 103 | 0.096 | 12 | 1.5 | 1 | 1 | 50 | 1.75 | −1.0 | −0.13 | −0.6 | 35 | 36 | 35 |
| 103 | 0.986 | 12 | 1.5 | 1 | 1 | 50 | 1.75 | −3.0 | 0.00 | −1.0 | 44 | 10 | 16 |
| 103 | 0.876 | 12 | 1.5 | 1 | 1 | 49 | 2.00 | −5.6 | 1.25 | −0.6 | 21 | 26 | 35 |
| 103 | 0.338 | 12 | 1.5 | 1 | 1 | 49 | 2.25 | −6.4 | 1.50 | −2.2 | 30 | 15 | 20 |
| 103 | 0.488 | 12 | 1.5 | 1 | | 49 | 2.25 | −5.8 | 0.63 | −3.0 | 9 | 15 | 35 |
| 103 | 0.386 | 12 | 1.5 | 1 | 1 | 66 | 2.25 | −3.8 | 0.88 | −0.8 | 7 | 0 | 9 |
| 103 | 0.813 | 12 | 1.5 | 1 | 1 | 49 | 3.00 | −4.8 | 1.25 | −1.6 | 39 | 4 | 21 |
| 103 | 0.150 | 12 | 1.5 | 1 | 1 | 38 | 0.50 | 0.0 | 2.25 | 0.0 | 40 | 50 | 45 |
| 103 | 0.864 | 12 | 1.5 | 1 | 1 | 40 | 0.50 | −0.4 | 2.00 | 0.0 | 45 | 50 | 48 |
| 103 | 0.507 | 12 | 1.5 | 1 | 1 | 37 | 0.75 | 0.0 | 2.00 | 0.0 | 43 | 30 | 45 |
| 103 | 0.121 | 12 | 1.5 | 1 | 1 | 38 | 1.00 | 0.0 | 2.00 | 0.0 | 35 | 50 | 43 |
| 103 | 0.915 | 12 | 1.5 | 1 | 1 | 42 | 1.00 | 0.0 | 2.00 | 0.0 | 50 | 50 | 50 |
| 103 | 0.334 | 12 | 1.5 | 1 | 1 | 46 | 1.25 | −2.0 | 2.00 | −2.0 | 50 | 35 | 50 |
| 103 | 0.311 | 12 | 1.5 | 1 | 1 | 45 | 1.25 | 0.0 | 2.00 | 0.0 | 30 | 40 | 35 |
| 103 | 0.791 | 12 | 1.5 | 1 | 1 | 48 | 1.25 | −1.0 | 2.00 | −1.0 | 40 | 39 | 40 |
| 103 | 0.744 | 12 | 1.5 | 1 | 1 | 67 | 1.50 | −1.0 | 1.00 | 0.0 | 40 | 45 | 45 |
| 103 | 0.008 | 12 | 1.5 | 1 | 1 | 41 | 1.50 | 0.0 | 2.00 | 0.0 | 47 | 47 | 49 |
| 103 | 0.989 | 12 | 1.5 | 1 | 1 | 44 | 1.50 | 0.0 | 1.00 | 0.0 | 35 | 45 | 40 |
| 103 | 0.885 | 12 | 1.5 | 1 | 1 | 48 | 1.50 | −2.0 | 1.00 | −1.6 | 50 | 25 | 40 |
| 103 | 0.295 | 12 | 1.5 | 1 | 1 | 55 | 1.75 | −2.0 | 0.00 | 0.0 | 40 | 40 | 50 |
| 103 | 0.459 | 12 | 1.5 | 1 | 1 | 38 | 1.75 | −6.0 | 3.00 | −1.0 | 43 | 15 | 25 |
| 103 | 0.505 | 12 | 1.5 | 1 | 1 | 47 | 1.75 | −6.0 | 2.00 | −2.6 | 48 | 30 | 45 |
| 103 | 0.827 | 12 | 1.5 | 1 | 1 | 51 | 1.75 | −3.4 | 1.00 | 0.0 | 45 | 45 | 45 |
| 103 | 0.624 | 12 | 1.5 | 1 | 1 | 51 | 1.75 | −3.0 | 1.00 | −1.0 | 50 | 25 | 35 |
| 103 | 0.282 | 12 | 1.5 | 1 | 1 | 57 | 1.75 | −5.2 | 0.25 | −1.0 | 47 | 35 | 35 |
| 103 | 0.638 | 12 | 1.5 | 1 | 1 | 69 | 2.00 | −1.4 | 0.00 | −0.6 | 48 | 40 | 50 |
| 103 | 0.705 | 12 | 1.5 | 1 | 1 | 55 | 2.25 | −1.0 | 1.13 | 0.0 | 49 | 35 | 40 |
| 103 | 0.453 | 12 | 1.5 | 1 | 1 | 50 | 2.50 | −4.0 | 1.13 | −1.6 | 48 | 25 | 36 |
| 104 | 0.404 | 7 | 1.5 | 1 | 2 | 40 | 1.00 | −0.4 | 0.80 | −0.2 | 38 | 44 | 41 |
| 104 | 0.401 | 7 | 1.5 | 1 | 2 | 44 | 1.50 | −2.0 | 1.00 | 0.2 | 48 | 49 | 49 |
| 104 | 0.379 | 7 | 1.5 | 1 | 2 | 42 | 1.50 | −3.0 | 1.60 | −0.2 | 44 | 39 | 42 |
| 104 | 0.326 | 7 | 1.5 | 1 | 2 | 46 | 1.75 | −2.6 | 1.00 | −1.0 | 31 | 24 | 28 |
| 104 | 0.066 | 7 | 1.5 | 1 | 2 | 53 | 1.75 | −2.2 | 1.00 | 0.4 | 50 | 46 | 48 |
| 104 | 0.932 | 7 | 1.5 | 1 | 2 | 48 | 2.00 | −3.4 | 1.00 | 0.0 | 50 | 50 | 50 |
| 104 | 0.448 | 7 | 1.5 | 1 | 2 | 53 | 2.00 | −4.0 | 1.00 | −2.8 | 50 | 36 | 43 |
| 104 | 0.391 | 7 | 1.5 | 1 | 2 | 53 | 2.00 | −3.8 | 0.60 | −1.0 | 49 | 41 | 45 |
| 104 | 0.663 | 7 | 1.5 | 1 | 2 | 50 | 2.25 | −3.6 | 1.60 | −1.2 | 25 | 10 | 13 |
| 104 | 0.226 | 7 | 1.5 | 1 | 2 | 51 | 2.25 | −6.4 | 0.00 | −1.2 | 50 | 50 | 50 |
| 104 | 0.375 | 7 | 1.5 | 1 | 2 | 48 | 1.00 | −0.0 | 0.50 | 1.0 | 42 | 46 | 46 |
| 104 | 0.793 | 7 | 1.5 | 1 | 2 | 46 | 1.00 | 0.0 | −0.13 | −1.8 | 37 | 37 | 37 |
| 104 | 0.845 | 7 | 1.5 | 1 | 2 | 45 | 1.00 | −0.6 | 2.00 | 1.8 | 25 | 47 | 35 |
| 104 | 0.309 | 7 | 1.5 | 1 | 2 | 53 | 1.50 | −3.0 | 1.00 | −0.6 | 50 | 19 | 19 |
| 104 | 0.299 | 7 | 1.5 | 1 | 2 | 50 | 1.50 | −3.2 | 1.50 | 0.8 | 40 | 40 | 40 |
| 104 | 0.910 | 7 | 1.5 | 1 | 2 | 50 | 1.50 | −2.4 | 0.00 | 1.0 | 20 | 45 | 40 |
| 104 | 0.564 | 7 | 1.5 | 1 | 2 | 52 | 1.50 | −6.8 | 2.00 | −2.2 | 40 | 15 | 20 |
| 104 | 0.720 | 7 | 1.5 | 1 | 2 | 53 | 1.75 | −6.4 | 1.88 | −1.2 | 15 | 40 | 30 |
| 104 | 0.362 | 7 | 1.5 | 1 | 2 | 54 | 1.75 | −3.0 | 1.75 | −0.4 | 17 | 18 | 18 |
| 104 | 0.919 | 7 | 1.5 | 1 | 2 | 52 | 1.75 | −4.4 | 0.75 | 1.0 | 45 | 46 | 46 |

TABLE I-continued

| | Optical Design Parameters | | | | | Patient Parameters | | | Actual VA Measurements | | Subjective Response Ratings | | |
|---|---|---|---|---|---|---|---|---|---|---|---|---|---|
| design code | rand. train learn | no. of rings | lens add power | monc/ binoc mon = 1 bin = 2 | pupil d/q = 1 d/q/d = 2 n/q/d = 3 | age | add | Hloss | dist hi l hi c | near hi l hi c | dist. | near | overall |
| 104 | 0.991 | 7 | 1.5 | 1 | 2 | 50 | 1.75 | −1.0 | 0.68 | −0.8 | 13 | 11 | 21 |
| 104 | 0.409 | 7 | 1.5 | 1 | 2 | 50 | 1.75 | −3.0 | 0.63 | −2.0 | 37 | 15 | 19 |
| 104 | 0.561 | 7 | 1.5 | 1 | 2 | 49 | 2.00 | −5.6 | 0.63 | −0.6 | 15 | 28 | 45 |
| 104 | 0.428 | 7 | 1.5 | 1 | 2 | 49 | 2.25 | −6.4 | 1.63 | −0.4 | 38 | 19 | 35 |
| 104 | 0.458 | 7 | 1.5 | 1 | 2 | 49 | 2.25 | −5.8 | 0.88 | −0.3 | 20 | 4 | 10 |
| 104 | 0.410 | 7 | 1.5 | 1 | 2 | 66 | 2.25 | −3.8 | 0.88 | −0.6 | 7 | 3 | 7 |
| 104 | 0.460 | 7 | 1.5 | 1 | 2 | 49 | 3.00 | −4.8 | 0.88 | −0.6 | 42 | 17 | 34 |
| 104 | 0.153 | 7 | 1.5 | 1 | 2 | 38 | 0.50 | 0.0 | 2.00 | 0.0 | 35 | 45 | 40 |
| 104 | 0.867 | 7 | 1.5 | 1 | 2 | 40 | 0.50 | −0.4 | 2.00 | 0.0 | 43 | 45 | 35 |
| 104 | 0.893 | 7 | 1.5 | 1 | 2 | 37 | 0.75 | 0.0 | 2.00 | 0.0 | 45 | 30 | 45 |
| 104 | 0.273 | 7 | 1.5 | 1 | 2 | 38 | 1.00 | 0.0 | 1.38 | 0.0 | 40 | 50 | 45 |
| 104 | 0.877 | 7 | 1.5 | 1 | 2 | 42 | 1.00 | 0.0 | 2.00 | 0.0 | 42 | 50 | 45 |
| 104 | 0.228 | 7 | 1.5 | 1 | 2 | 46 | 1.25 | −2.0 | 2.00 | 0.025 | 35 | 35 | 45 |
| 104 | 0.460 | 7 | 1.5 | 1 | 2 | 45 | 1.25 | 0.0 | 2.25 | 0.0 | 34 | 40 | 30 |
| 104 | 0.140 | 7 | 1.5 | 1 | 2 | 48 | 1.25 | −1.0 | 2.00 | −1.0 | 45 | 40 | 40 |
| 104 | 0.176 | 7 | 1.5 | 1 | 2 | 67 | 1.50 | −1.0 | 1.00 | −1.0 | 42 | 48 | 40 |
| 104 | 0.240 | 7 | 1.5 | 1 | 2 | 41 | 1.50 | 0.0 | 2.00 | 0.0 | 47 | 47 | 47 |
| 104 | 0.806 | 7 | 1.5 | 1 | 2 | 44 | 1.5 | 0.0 | 0.00 | 0.0 | 40 | 40 | 40 |
| 104 | 0.636 | 7 | 1.5 | 1 | 2 | 48 | 1.50 | −2.0 | 1.00 | −1.0 | 50 | 20 | 50 |
| 104 | 0.647 | 7 | 1.5 | 1 | 2 | 55 | 1.75 | −2.0 | 1.00 | 0.0 | 48 | 50 | 50 |
| 104 | 0.109 | 7 | 1.5 | 1 | 2 | 38 | 1.75 | −6.0 | 3.00 | −1.0 | 40 | 20 | 25 |
| 104 | 0.068 | 7 | 1.5 | 1 | 2 | 47 | 1.75 | −6.0 | 1.00 | −2.6 | 45 | 50 | 47 |
| 104 | 0.801 | 7 | 1.5 | 1 | 2 | 51 | 1.75 | −3.4 | 1.00 | −2.0 | 40 | 45 | 45 |
| 104 | 0.624 | 7 | 1.5 | 1 | 2 | 51 | 1.75 | −3.0 | 1.00 | −2.4 | 50 | 50 | 45 |
| 104 | 0.000 | 7 | 1.5 | 1 | 2 | 57 | 1.75 | −5.2 | 0.00 | −1.0 | 45 | 48 | 47 |
| 104 | 0.521 | 7 | 1.5 | 1 | 2 | 69 | 2.00 | −1.4 | 0.00 | −1.0 | 48 | 40 | 45 |
| 104 | 0.254 | 7 | 1.5 | 1 | 2 | 54 | 2.00 | −6.0 | 0.00 | −1.0 | 48 | 48 | 30 |
| 104 | 0.604 | 7 | 1.5 | 1 | 2 | 55 | 2.25 | −1.0 | 2.00 | 0.0 | 49 | 45 | 47 |
| 104 | 0.814 | 7 | 1.5 | 1 | 2 | 50 | 2.50 | −4.0 | 2.00 | −1.8 | 45 | 40 | 48 |
| 105/6 | 0.435 | 6.5 | 1.5 | 2 | 1 | 48 | 1.00 | −0.0 | 0.75 | 0.2 | 26 | 32 | 30 |
| 105/6 | 0.172 | 6.5 | 1.5 | 2 | 1 | 46 | 1.00 | 0.0 | −1.00 | −1.4 | 17 | 20 | 19 |
| 105/6 | 0.891 | 6.5 | 1.5 | 2 | 1 | 45 | 1.00 | −0.6 | 1.75 | 1.4 | 43 | 48 | 45 |
| 105/6 | 0.201 | 6.5 | 1.5 | 2 | 1 | 50 | 1.50 | −3.2 | 2.00 | 0.6 | 40 | 48 | 45 |
| 105/6 | 0.233 | 6.5 | 1.5 | 2 | 1 | 52 | 1.50 | −6.8 | 1.50 | −1.0 | 30 | 15 | 20 |
| 105/6 | 0.190 | 6.5 | 1.5 | 2 | 1 | 60 | 1.50 | −2.6 | 0.25 | −1.0 | 25 | 13 | 18 |
| 105/6 | 0.165 | 6.5 | 1.5 | 2 | 1 | 53 | 1.50 | −3.0 | 1.13 | −0.8 | 50 | 5 | 14 |
| 105/6 | 0.982 | 6.5 | 1.5 | 2 | 1 | 50 | 1.50 | −2.4 | −0.13 | −1.0 | 30 | 37 | 35 |
| 105/6 | 0.295 | 6.5 | 1.5 | 2 | 1 | 54 | 1.75 | −3.0 | 1.75 | 0.0 | 16 | 16 | 18 |
| 105/6 | 0.519 | 6.5 | 1.5 | 2 | 1 | 50 | 1.75 | −1.0 | 0.88 | −0.4 | 30 | 20 | 27 |
| 105/6 | 0.983 | 6.5 | 1.5 | 2 | 1 | 53 | 1.75 | −6.4 | 2.50 | −1.6 | 20 | 10 | 15 |
| 105/6 | 0.411 | 6.5 | 1.5 | 2 | 1 | 49 | 2.25 | −6.4 | 2.75 | 0.0 | 22 | 15 | 18 |
| 105/6 | 0.021 | 6.5 | 1.5 | 2 | 1 | 49 | 2.25 | −5.8 | 0.63 | −3.2 | 37 | 16 | 35 |
| 105/6 | 0.825 | 6.5 | 1.5 | 2 | 1 | 49 | 3.00 | −4.8 | 1.63 | −1.6 | 23 | 13 | 21 |
| 107/8 | 0.435 | 6 | 1.5 | 2 | 2 | 48 | 1.00 | −0.0 | 1.25 | 0.0 | 44 | 42 | 44 |
| 107/8 | 0.932 | 6 | 1.5 | 2 | 2 | 45 | 1.00 | −0.6 | 2.00 | 1.8 | 35 | 37 | 36 |
| 107/8 | 0.009 | 6 | 1.5 | 2 | 2 | 50 | 1.50 | −3.2 | 1.75 | 1.2 | 25 | 47 | 35 |
| 107/8 | 0.665 | 6 | 1.5 | 2 | 2 | 52 | 1.50 | −6.8 | 1.00 | −1.0 | 20 | 30 | 25 |
| 107/8 | 0.438 | 6 | 1.5 | 2 | 2 | 53 | 1.50 | −3.0 | 1.63 | −1.6 | 50 | 50 | 50 |
| 107/8 | 0.373 | 6 | 1.5 | 2 | 2 | 50 | 1.50 | −2.4 | 0.00 | −0.4 | 35 | 41 | 37 |
| 107/8 | 0.469 | 6 | 1.5 | 2 | 2 | 54 | 1.75 | −3.0 | 1.25 | 0.2 | 33 | 33 | 38 |
| 107/8 | 0.538 | 6 | 1.5 | 2 | 2 | 52 | 1.75 | −4.4 | 1.25 | 1.4 | 37 | 40 | 39 |
| 107/8 | 0.412 | 6 | 1.5 | 2 | 2 | 50 | 1.75 | −1.0 | 1.13 | 0.0 | 37 | 32 | 33 |
| 107/8 | 0.731 | 6 | 1.5 | 2 | 2 | 53 | 1.75 | −6.4 | 1.75 | −2.0 | 25 | 20 | 25 |
| 107/8 | 0.214 | 6 | 1.5 | 2 | 2 | 66 | 2.25 | −3.8 | 0.13 | −0.6 | 7 | 7 | 7 |
| 107/8 | 0.827 | 6 | 1.5 | 2 | 2 | 49 | 2.25 | −6.4 | 2.50 | 2.4 | 19 | 19 | 19 |
| 107/8 | 0.309 | 6 | 1.5 | 2 | 2 | 49 | 2.25 | −5.8 | 1.75 | −1.8 | 40 | 15 | 35 |
| 107/8 | 0.979 | 6 | 1.5 | 2 | 2 | 49 | 3.00 | −4.8 | 1.88 | −2.6 | 19 | 2 | 19 |
| 109/10 | 0.854 | 3 | 1.5 | 2 | 2 | 48 | 1.00 | −0.0 | 0.33 | 1.0 | 28 | 25 | 26 |
| 109/10 | 0.201 | 3 | 1.5 | 2 | 2 | 50 | 1.50 | −3.2 | 1.75 | 1.4 | 30 | 45 | 38 |
| 109/10 | 0.246 | 3 | 1.5 | 2 | 2 | 60 | 1.50 | −2.6 | 0.00 | −1.6 | 18 | 15 | 20 |
| 109/10 | 0.573 | 3 | 1.5 | 2 | 2 | 50 | 1.50 | −2.4 | 1.88 | 1.0 | 29 | 40 | 35 |
| 109/10 | 0.044 | 3 | 1.5 | 2 | 2 | 54 | 1.75 | −3.0 | 1.88 | 1.0 | 29 | 28 | 28 |
| 109/10 | 0.260 | 3 | 1.5 | 2 | 2 | 50 | 1.75 | −1.0 | 1.88 | 0.0 | 39 | 35 | 38 |
| 109/10 | 0.207 | 3 | 1.5 | 2 | 2 | 53 | 1.75 | −6.4 | 1.88 | −2.4 | 25 | 20 | 30 |
| 109/10 | 0.559 | 3 | 1.5 | 2 | 2 | 50 | 1.75 | −3.0 | 1.13 | −2.0 | 37 | 18 | 18 |
| 109/10 | 0.893 | 3 | 1.5 | 2 | 2 | 66 | 2.25 | −3.8 | 0.75 | −1.0 | 10 | 3 | 10 |
| 109/10 | 0.474 | 3 | 1.5 | 2 | 2 | 49 | 2.25 | −6.4 | 1.88 | 0.6 | 21 | 22 | 21 |
| 109/10 | 0.569 | 3 | 1.5 | 2 | 2 | 49 | 2.25 | −5.8 | 1.63 | −0.4 | 15 | 10 | 15 |
| 111/12 | 0.479 | 4.5 | 1.5 | 2 | 1 | 48 | 1.00 | −0.0 | 1.88 | 1.0 | 40 | 39 | 40 |
| 111/12 | 0.907 | 4.5 | 1.5 | 2 | 1 | 50 | 1.50 | −3.2 | 1.88 | 1.2 | 35 | 45 | 40 |

TABLE I-continued

| | | Optical Design Parameters | | | | | | | Actual VA Measurements | | | | |
| | | | monc/binoc mon = 1 | pupil d/q = 1 d/q/d = 2 | | Patient Parameters | | | dist hi l | near hi l | Subjective Response Ratings | | |
| design code | rand. train learn | no. of rings | lens add power | bin = 2 | n/q/d = 3 | age | add | Hloss | hi c | hi c | dist. | near | overall |
|---|---|---|---|---|---|---|---|---|---|---|---|---|---|
| 111/12 | 0.716 | 4.5 | 1.5 | 2 | 1 | 60 | 1.50 | −2.6 | 0.63 | −1.0 | 20 | 9 | 21 |
| 111/12 | 0.413 | 4.5 | 1.5 | 2 | 1 | 50 | 1.50 | −2.4 | 1.88 | 0.0 | 24 | 20 | 21 |
| 111/12 | 0.478 | 4.5 | 1.5 | 2 | 1 | 54 | 1.75 | −3.0 | 2.00 | 1.0 | 30 | 29 | 31 |
| 111/12 | 0.054 | 4.5 | 1.5 | 2 | 1 | 50 | 1.75 | −1.0 | 1.88 | 0.8 | 23 | 19 | 19 |
| 111/12 | 0.926 | 4.5 | 1.5 | 2 | 1 | 53 | 1.75 | −6.4 | 1.88 | −0.4 | 30 | 40 | 35 |
| 111/12 | 0.882 | 4.5 | 1.5 | 2 | 1 | 50 | 1.75 | −3.0 | 0.00 | −1.0 | 38 | 10 | 17 |
| 111/12 | 0.295 | 4.5 | 1.5 | 2 | 1 | 66 | 2.25 | −3.8 | 0.88 | −1.4 | 10 | 7 | 14 |
| 111/12 | 0.829 | 4.5 | 1.5 | 2 | 1 | 49 | 2.25 | −6.4 | 2.00 | 1.0 | 19 | 18 | 18 |
| 111/12 | 0.718 | 4.5 | 1.5 | 2 | 1 | 49 | 2.25 | −5.8 | 1.00 | −1.0 | 2 | 2 | 0 |
| 111/12 | 0.042 | 4.5 | 1.5 | 2 | 1 | 49 | 3.00 | −4.8 | 1.88 | −2.6 | 19 | 2 | 19 |
| 113 | 0.50 | 5 | 1.5 | 1 | 2 | 48 | 1.00 | −0.0 | 1.63 | 1.0 | 44 | 44 | 44 |
| 113 | 0.426 | 5 | 1.5 | 1 | 2 | 46 | 1.00 | 0.0 | −0.25 | −1.4 | 37 | 30 | 33 |
| 113 | 0.961 | 5 | 1.5 | 1 | 2 | 45 | 1.00 | −0.6 | 2.88 | 1.6 | 47 | 46 | 46 |
| 113 | 0.006 | 5 | 1.5 | 1 | 2 | 50 | 1.50 | −3.2 | 2.38 | 1.0 | 47 | 45 | 46 |
| 113 | 0.014 | 5 | 1.5 | 1 | 2 | 60 | 1.50 | −2.6 | −0.25 | −1.0 | 21 | 17 | 20 |
| 113 | 0.357 | 5 | 1.5 | 1 | 2 | 53 | 1.50 | −3.0 | 1.50 | −0.8 | 38 | 38 | 38 |
| 113 | 0.642 | 5 | 1.5 | 1 | 2 | 50 | 1.50 | −2.4 | 0.00 | 1.0 | 32 | 36 | 34 |
| 113 | 0.281 | 5 | 1.5 | 1 | 2 | 54 | 1.75 | −3.0 | 1.88 | 0.6 | 34 | 35 | 36 |
| 113 | 0.763 | 5 | 1.5 | 1 | 2 | 52 | 1.75 | −4.4 | 1.50 | 0.8 | 30 | 22 | 26 |
| 113 | 0.161 | 5 | 1.5 | 1 | 2 | 50 | 1.75 | −1.0 | 1.75 | −0.8 | 35 | 26 | 30 |
| 113 | 0.556 | 5 | 1.5 | 1 | 2 | 53 | 1.75 | −6.4 | 1.00 | −0.4 | 20 | 20 | 15 |
| 113 | 0.596 | 5 | 1.5 | 1 | 2 | 49 | 2.00 | −5.6 | 0.63 | 0.0 | 17 | 25 | 28 |
| 113 | 0.409 | 5 | 1.5 | 1 | 2 | 66 | 2.25 | −3.8 | 0.88 | −1.0 | 15 | 10 | 15 |
| 113 | 0.025 | 5 | 1.5 | 1 | 2 | 49 | 2.25 | −6.4 | 2.00 | −0.4 | 23 | 15 | 19 |
| 113 | 0.613 | 5 | 1.5 | 1 | 2 | 49 | 2.25 | −5.8 | 1.88 | −2.0 | 37 | 15 | 20 |
| 113 | 0.679 | 5 | 1.5 | 1 | 2 | 49 | 3.00 | −4.8 | 1.00 | −1.2 | 12 | 15 | 31 |
| 114 | 0.814 | 6 | 1.5 | 1 | 3 | 46 | 1.00 | 0.0 | −0.5 | −1.6 | 37 | 35 | 36 |
| 114 | 0.465 | 6 | 1.5 | 1 | 3 | 45 | 1.00 | −0.6 | 2.38 | 1.0 | 47 | 42 | 44 |
| 114 | 0.818 | 6 | 1.5 | 1 | 3 | 50 | 1.50 | −3.2 | 2.13 | 0.6 | 40 | 45 | 42 |
| 114 | 0.719 | 6 | 1.5 | 1 | 3 | 60 | 1.50 | −2.6 | 0.13 | −2.0 | 23 | 2 | 19 |
| 114 | 0.971 | 6 | 1.5 | 1 | 3 | 53 | 1.50 | −3.0 | 1.25 | −1.2 | 38 | 37 | 38 |
| 114 | 0.385 | 6 | 1.5 | 1 | 3 | 50 | 1.50 | −2.4 | 1.75 | 0.6 | 34 | 36 | 35 |
| 114 | 0.216 | 6 | 1.5 | 1 | 3 | 54 | 1.75 | −3.0 | 1.88 | 0.6 | 28 | 28 | 29 |
| 114 | 0.508 | 6 | 1.5 | 1 | 3 | 53 | 1.75 | −6.4 | 2.00 | −1.0 | 36 | 17 | 30 |
| 114 | 0.961 | 6 | 1.5 | 1 | 3 | 50 | 1.75 | −3.0 | 0.88 | −2.0 | 40 | 19 | 20 |
| 114 | 0.163 | 6 | 1.5 | 1 | 3 | 66 | 2.25 | −3.8 | 1.00 | −2.0 | 10 | 2 | 10 |
| 114 | 0.346 | 6 | 1.5 | 1 | 3 | 49 | 2.25 | −6.4 | 1.75 | −0.8 | 19 | 14 | 18 |
| 114 | 0.487 | 6 | 1.5 | 1 | 3 | 49 | 2.25 | −5.8 | 1.00 | 0.0 | 35 | 16 | 25 |
| 114 | 0.171 | 6 | 1.51 | 1 | 3 | 49 | 3.00 | −4.8 | 1.63 | −1.2 | 29 | 7 | 13 |
| 203 | 0.596 | 12 | 2 | 1 | 1 | 48 | 1.00 | −0.0 | 0.25 | 1.0 | 35 | 37 | 36 |
| 203 | 0.014 | 12 | 2 | 1 | 1 | 46 | 1.00 | 0.0 | −1.00 | −1.6 | 16 | 15 | 15 |
| 203 | 0.182 | 12 | 2 | 1 | 1 | 49 | 1.25 | −1.2 | 0.00 | 0.0 | 20 | 35 | 25 |
| 203 | 0.683 | 12 | 2 | 1 | 1 | 50 | 1.50 | −3.2 | 0.63 | 0.6 | 30 | 45 | 40 |
| 203 | 0.821 | 12 | 2 | 1 | 1 | 52 | 1.50 | −6.8 | 0.00 | 0.0 | 5 | 30 | 10 |
| 203 | 0.410 | 12 | 2 | 1 | 1 | 60 | 1.50 | −2.6 | 0.63 | −1.0 | 23 | 16 | 21 |
| 203 | 0.767 | 12 | 2 | 1 | 1 | 50 | 1.50 | −2.4 | 1.13 | −0.6 | 25 | 35 | 30 |
| 203 | 0.022 | 12 | 2 | 1 | 1 | 54 | 1.75 | −3.0 | 0.88 | 1.0 | 9 | 10 | 14 |
| 203 | 0.582 | 12 | 2 | 1 | 1 | 50 | 1.75 | −1.0 | 1.00 | −0.6 | 39 | 38 | 38 |
| 203 | 0.888 | 12 | 2 | 1 | 1 | 53 | 1.75 | −6.4 | 0.75 | 0.0 | 35 | 45 | 41 |
| 203 | 0.738 | 12 | 2 | 1 | 1 | 50 | 1.75 | −3.0 | 0.00 | −1.0 | 36 | 15 | 19 |
| 203 | 0.657 | 12 | 2 | 1 | 1 | 49 | 2.00 | −5.6 | 0.63 | −0.2 | 8 | 22 | 45 |
| 203 | 0.432 | 12 | 2 | 1 | 1 | 66 | 2.25 | −3.8 | 1.63 | −1.2 | 8 | 3 | 7 |
| 203 | 0.940 | 12 | 2 | 1 | 1 | 49 | 2.25 | −6.4 | 1.50 | 0.8 | 19 | 15 | 17 |
| 203 | 0.935 | 12 | 2 | 1 | 1 | 49 | 2.25 | −5.8 | −0.75 | −1.0 | 7 | 20 | 37 |
| 203 | 0.965 | 12 | 2 | 1 | 1 | 49 | 3.00 | −4.8 | 0.88 | 0.0 | 17 | 9 | 12 |
| 204 | 0.748 | 7 | 2 | 1 | 2 | 48 | 1.00 | −0.0 | 1.00 | 0.0 | 36 | 39 | 37 |
| 204 | 0.175 | 7 | 2 | 1 | 2 | 50 | 1.50 | −3.2 | 1.63 | 0.8 | 35 | 45 | 40 |
| 204 | 0.383 | 7 | 2 | 1 | 2 | 52 | 1.50 | −6.8 | 0.00 | −2.0 | 40 | 20 | 25 |
| 204 | 0.542 | 7 | 2 | 1 | 2 | 60 | 1.50 | −2.6 | 0.00 | −0.6 | 23 | 20 | 25 |
| 204 | 0.661 | 7 | 2 | 1 | 2 | 50 | 1.50 | −2.4 | 2.00 | −1.0 | 30 | 35 | 33 |
| 204 | 0.331 | 7 | 2 | 1 | 2 | 54 | 1.75 | −3.0 | 0.25 | 0.4 | 14 | 20 | 15 |
| 204 | 0.710 | 7 | 2 | 1 | 2 | 50 | 1.75 | −1.0 | 0.50 | −0.6 | 23 | 19 | 19 |
| 204 | 0.061 | 7 | 2 | 1 | 2 | 53 | 1.75 | −6.4 | 0.63 | −1.4 | 30 | 35 | 40 |
| 204 | 0.257 | 7 | 2 | 1 | 2 | 50 | 1.75 | −3.0 | 0.00 | −2.0 | 37 | 21 | 30 |
| 204 | 0.637 | 7 | 2 | 1 | 2 | 49 | 2.00 | −5.6 | 0.50 | 0.0 | 14 | 24 | 20 |
| 204 | 0.100 | 7 | 2 | 1 | 2 | 66 | 2.25 | −3.8 | 1.88 | −1.0 | 10 | 6 | 10 |
| 204 | 0.081 | 7 | 2 | 1 | 2 | 49 | 2.25 | −6.4 | 1.13 | 0.0 | 19 | 18 | 19 |
| 204 | 0.661 | 7 | 2 | 1 | 2 | 49 | 2.25 | −5.8 | 1.13 | −0.6 | 45 | 40 | 45 |

It is apparent from Table I that in some instances the subjective response ratings contradicted the actual VA measurements. This indicates that patients believe that VA measurements do not always provide the optimal lens design for that particular patient. Thus, it is important for the neural network to be trained with both actual VA and subjective response data so that the resulting trained neural network correctly models the nonlinear relationship between the various lens designs and both actual VA and subjective response ratings.

The next step was to utilize @BRAIN NNDS to create a fully connected feedforward neural network, as shown in FIG. 1, using the identified optical design and patient parameters as inputs, and actual VA and subjective response as outputs. Accordingly, the input layer has seven inputs (I1–I7) and the output layer has five processing elements (PE01–PE05) including five outputs (O1–O5). The remaining structure of the neural network consists of a first hidden layer having eleven processing elements (PEA1–PEA11) and a second hidden layer having eight processing elements (PEB1–PEB8).

The neural network is interconnected as shown in FIG. 1. All seven inputs of the input layer are routed to the inputs of all eleven processing elements of the first hidden layer. The outputs of all eleven processing elements of the first hidden layer are input to all eight processing elements of the second hidden layer. The outputs of all eight processing elements of the second hidden layer are input to all five processing elements of the output layer. The outputs of the five processing elements of the output layer are the five outputs of the neural network which correspond to actual VA and subjective response.

After the neural network was created, the neural network was trained using the data collected during the clinical evaluations. Training was accomplished by inputting the spreadsheet containing the clinically collected data into the neural network and allowing the training algorithm to learn the nonlinear relationship between the input design data and the output VA/subjective data.

Figure 2:
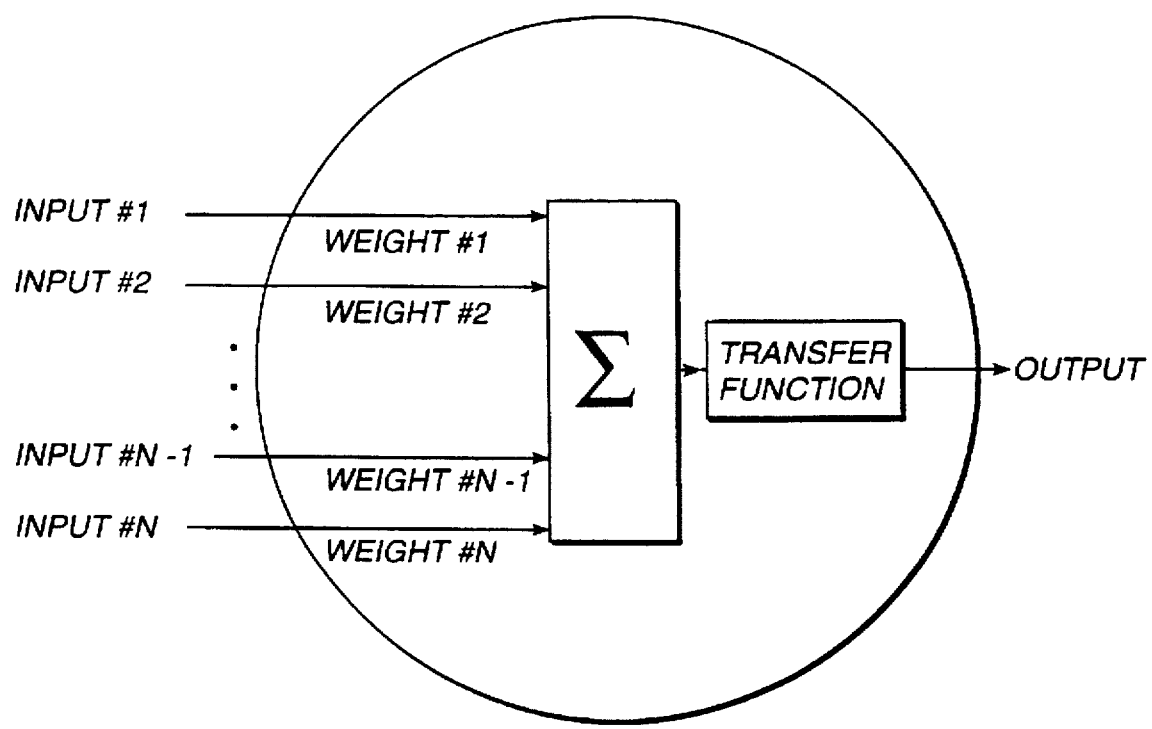
FIG. 2 shows a schematic representation of a processing elements used in a neural network.

The training process is accomplished as follows. The seven optical design and patient parameters are routed from the input layer to the inputs of all eleven processing elements of the first hidden layer. Each processing element, as shown in FIG. 2, multiplies each input by a different connection weight and adds the individual products. The results are passed through the sigmoid non-linear transfer function, as defined above, to produce eleven processing element outputs. All eleven processing element outputs of the first hidden layer are routed to the inputs of all eight processing elements of the second hidden layer. Again, each processing element multiplies each input by a different connection weight, adds the individual products and passes the results through the sigmoid non-linear transfer function to produce eight processing element outputs. All eight processing element outputs of the second hidden layer are routed to the inputs of all five processing elements of the output layer. And again, each processing element multiplies each input by a different connection weight, adds the individual products and passes the results through the sigmoid non-linear transfer function to produce five processing element outputs. These five processing element outputs are the five predicted VA/subjective outputs of the neural network.

During the training process, the training algorithm dynamically compares the five predicted VA/subjective outputs with the associated training data VA/subjective outputs for each set of training data inputs and dynamically changes the connection weights to find a set which minimizes the error between the predicted outputs and the training data outputs. Thus, after all the training data has been processed by the neural network, the resulting set of connection weights should accurately model the relationship between all the training data inputs and the associated training data outputs. The resulting neural network is called a trained neural network.

After training, the trained neural network was tested using a random ten percent of the clinically collected data. This data is defined as test data. Test data should not consist of data that is used to train the neural network. This insures, with successful test results, that the neural network has learned, not memorized, the relationship between the input training data and the output training data.

In the present embodiment, test data was distinguished from training data by utilizing a three digit random number generator to assign a three digit number, from 0.000 to 0.999, to each design case. The three digit numbers were generated and integrated into the spreadsheet as random training/learning numbers (see Table I). The neural network was programed to use any data associated with a number less than or equal to 0.100 as test data and any data associated with a number greater than 0.100 as training data.

Testing was accomplished by inputting test inputs, consisting of seven optical design and patient parameters, into the input layer of the trained neural network. In the input layer, the seven test inputs are routed from the input layer to the inputs of all eleven processing elements of the first hidden layer. Each processing element multiplies each input by the different connection weights that were determined during training and adds the individual products. The results are passed through the sigmoid non-linear transfer function to produce eleven processing element outputs. All eleven processing element outputs of the first hidden layer are routed to the inputs of all eight processing elements of the second hidden layer. Again, each processing element multiplies each input by the predetermined connection weights, adds the individual products and passes the results through the sigmoid non-linear transfer function to produce eight processing element outputs. All eight processing element outputs of the second hidden layer are routed to the inputs of all five processing elements of the output layer. And again, each processing element multiplies each input by the predetermined connection weights, adds the individual products and passes the results through the sigmoid non-linear transfer function to produce five processing element outputs. These five processing element outputs produce five predicted test outputs consisting of predicted VA and subjective test outputs.

The predicted test outputs were compared to the clinically collected VA/subjective outputs to determine if they were substantially the same. The predicted outputs were substantially the same for each patient in the test group, thus, the trained neural network was deemed valid.

A further sanity test was performed as follows. The clinically collected data was grouped by design code and averaged, thereby obtaining average values for all inputs and actual patient performance outputs of each design group (see Table II).

TABLE II

Average Input and Output Data for Each Design Group

| | Average Inputs to the Neural Network | | | | | | | Average Patient Performance Outputs | | Predicted Outputs | | Difference | |
|---|---|---|---|---|---|---|---|---|---|---|---|---|---|
| | | | monoc/ binoc | pupil type d/q = 1 | | | | VA | | | | | |
| design code | number of rings | lens add power | mon = 1 bin = 2 | d/q/d = 2 n/q/d = 3 | patient age | patient add | patient hloss | near nhh | near subjective | Near VA nhh | Near Subjective | Near VA Letters | Near Subjective |
| v103 | 12 | 1.5 | 1 | 1 | 51.2 | 1.67 | −3.52 | −0.76 | 33 | −0.95 | 34 | −1.55 | 1 |
| v104 | 7 | 1.5 | 1 | 2 | 51.2 | 1.67 | −3.52 | −0.77 | 37 | −0.66 | 33 | 0.90 | −4 |
| v105/6 | 6.5 | 1.5 | 2 | 1 | 51.2 | 1.67 | −3.52 | −0.65 | 21 | −0.39 | 26 | 0.90 | 5 |
| v107/8 | 6 | 1.5 | 2 | 2 | 51.2 | 1.67 | −3.52 | −0.28 | 37 | −0.47 | 33 | −1.53 | −4 |
| v109/0 | 3 | 1.5 | 2 | 2 | 51.2 | 1.67 | −3.52 | −0.37 | 29 | −0.16 | 29 | 1.66 | 0 |
| v111/2 | 4.5 | 1.5 | 2 | 1 | 51.2 | 1.67 | −3.52 | 0.09 | 25 | −0.21 | 24 | −2.44 | −1 |
| v113 | 6 | 1.5 | 1 | 2 | 51.2 | 1.67 | −3.52 | 0.04 | 29 | −0.56 | 33 | −4.80 | 4 |
| v114 | 6 | 1.5 | 1 | 3 | 51.2 | 1.67 | −3.52 | −0.63 | 26 | −0.86 | 29 | −1.87 | 3 |
| v203 | 12 | 2 | 1 | 1 | 51.2 | 1.67 | −3.52 | −0.20 | 28 | −0.33 | 28 | −1.03 | −0 |
| v204 | 7 | 2 | 1 | 2 | 51.2 | 1.67 | −3.52 | −0.71 | 27 | −0.36 | 31 | 2.79 | 4 |

Note: nhh is actual VA for near high contrast/high luminance in VA units (v.a.u.)

The average inputs for each individual design code were used as inputs to the trained neural network to obtain predicted near VA and subjective response outputs. These predicted outputs are listed in TABLE II.

The predicted outputs were compared to the actual average outputs and the difference between the VA and subjective outputs was calculated and recorded in TABLE II. The VA difference was calculated in Letters gained or lost, which is calculated by multiplying the VA difference in VA units by eight, which is the number of Letters on a line. The subjective difference was based on a 0 to 50 unitless range.

As is shown in Table II, the VA difference ranged from −4.80 to 2.79 Letters and the subjective difference ranged from −4 to 5, both of which are negligible. Thus, the sanity test further proved that the trained neural network was valid.

After training and testing, the trained neural network was used to predict distance and near VA and subjective response for several lens design as a function of the number of rings of each lens. To elaborate, average input parameters for five lens designs were input into the trained neural network as constants, except for number of rings which was varied from 1 to 12. Thus, a set of predicted VA and subjective outputs were obtained that were a function of number of rings.

The predicted VA and subjective output data was then plotted graphically for the following five lens designs: monocular d/q/d, monocular d/q, monocular n/q/d, binocular d/q, and binocular d/q/d.

Figure 3:
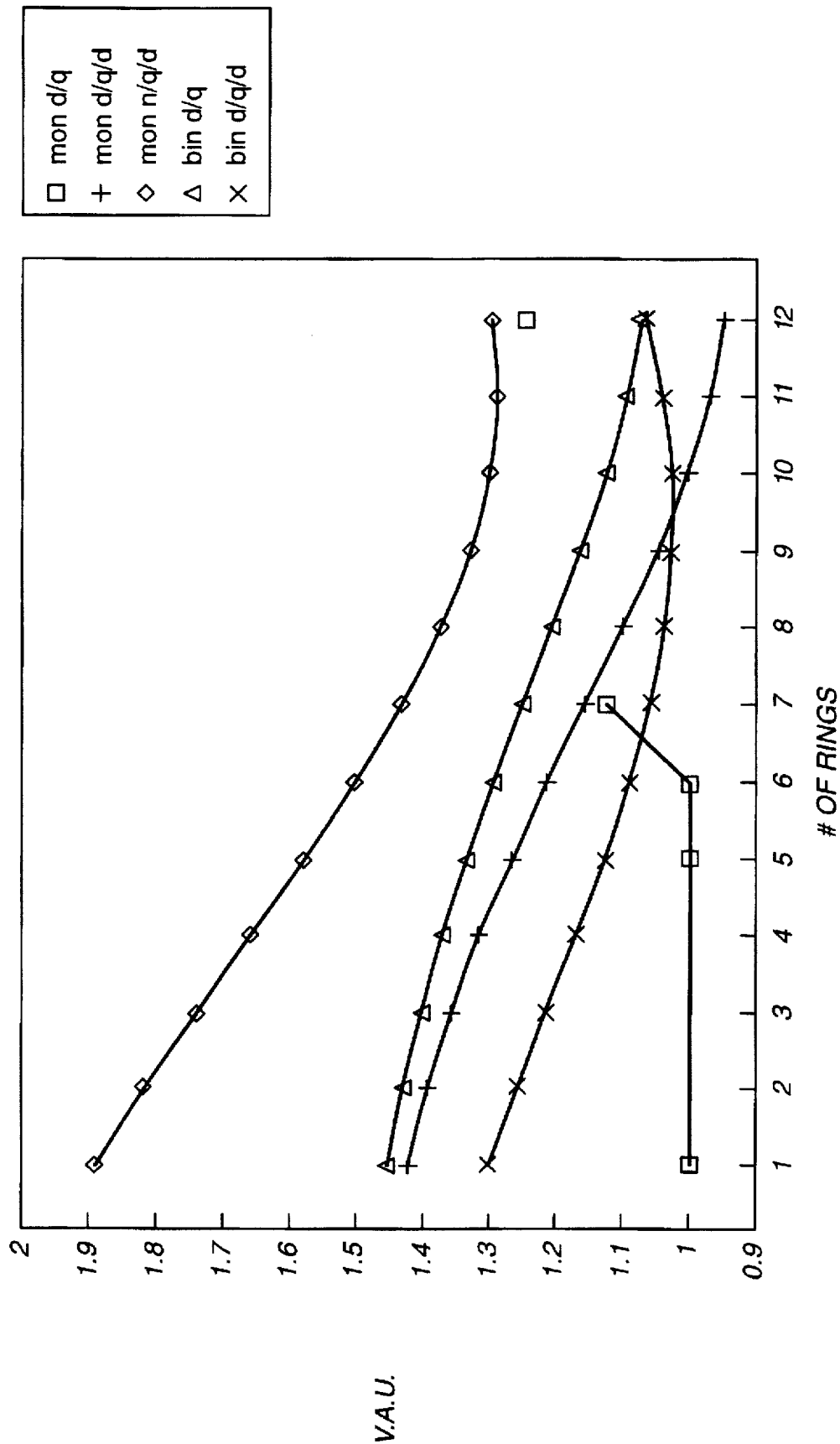
FIG. 3 shows a graph of predicted actual distance VA at high luminance high contrast plotted against number of rings for five different lens designs.
Figure 4:
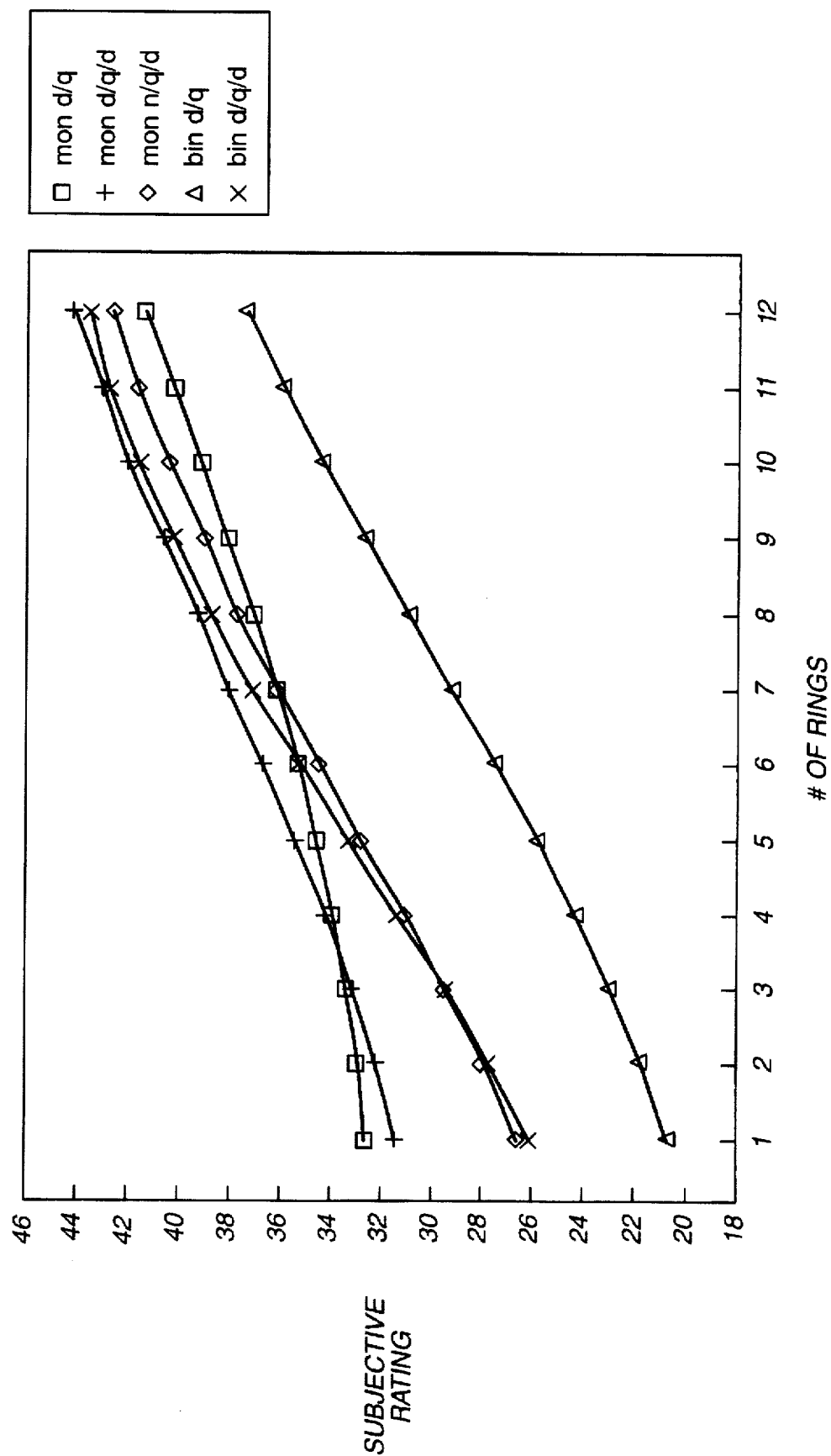
FIG. 4 shows a graph of predicted subjective distance response rating plotted against number of rings for five different lens designs.
Figure 5:
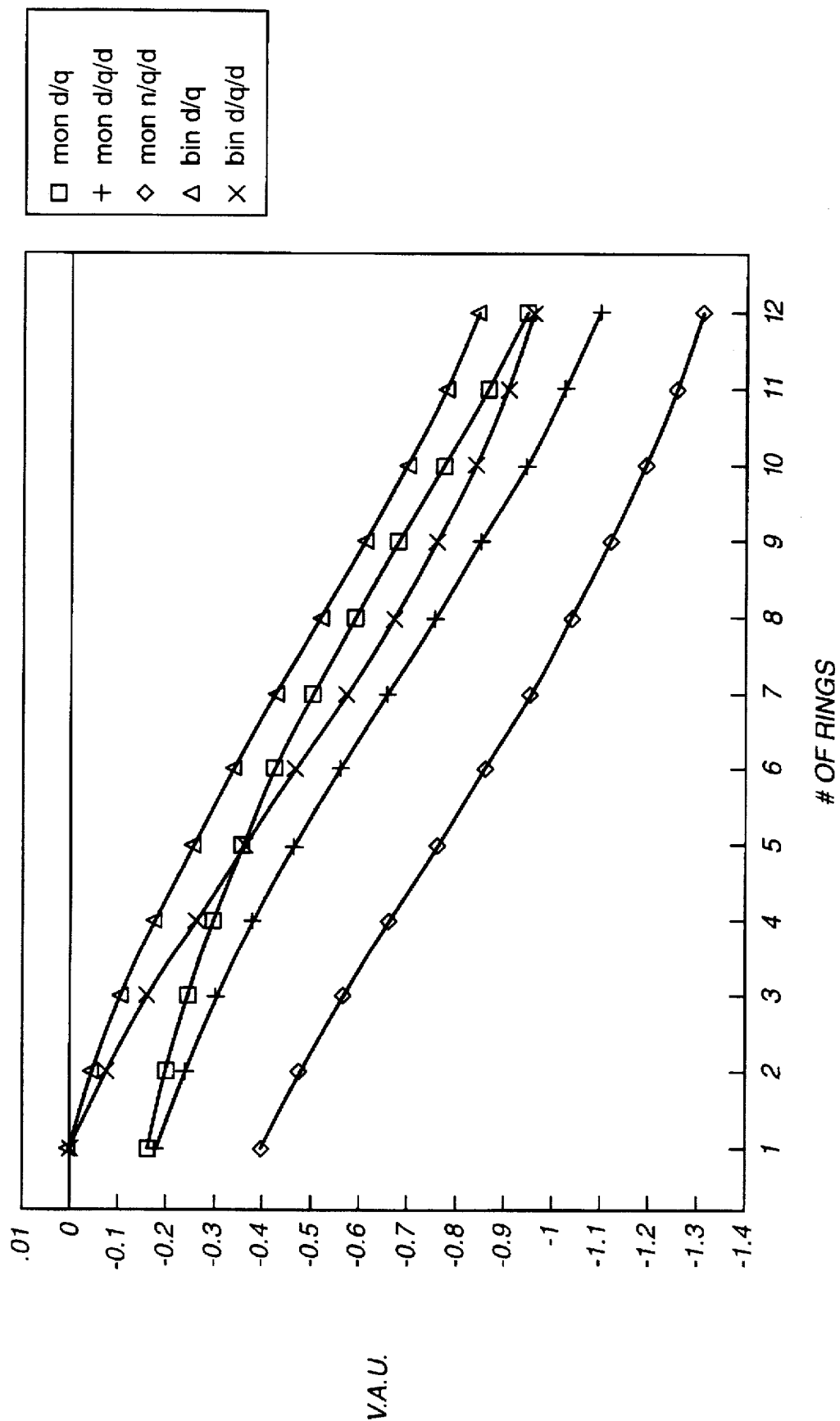
FIG. 5 shows a graph of predicted actual near VA at high luminance high contrast plotted against number of rings for five different lens designs.
Figure 6:
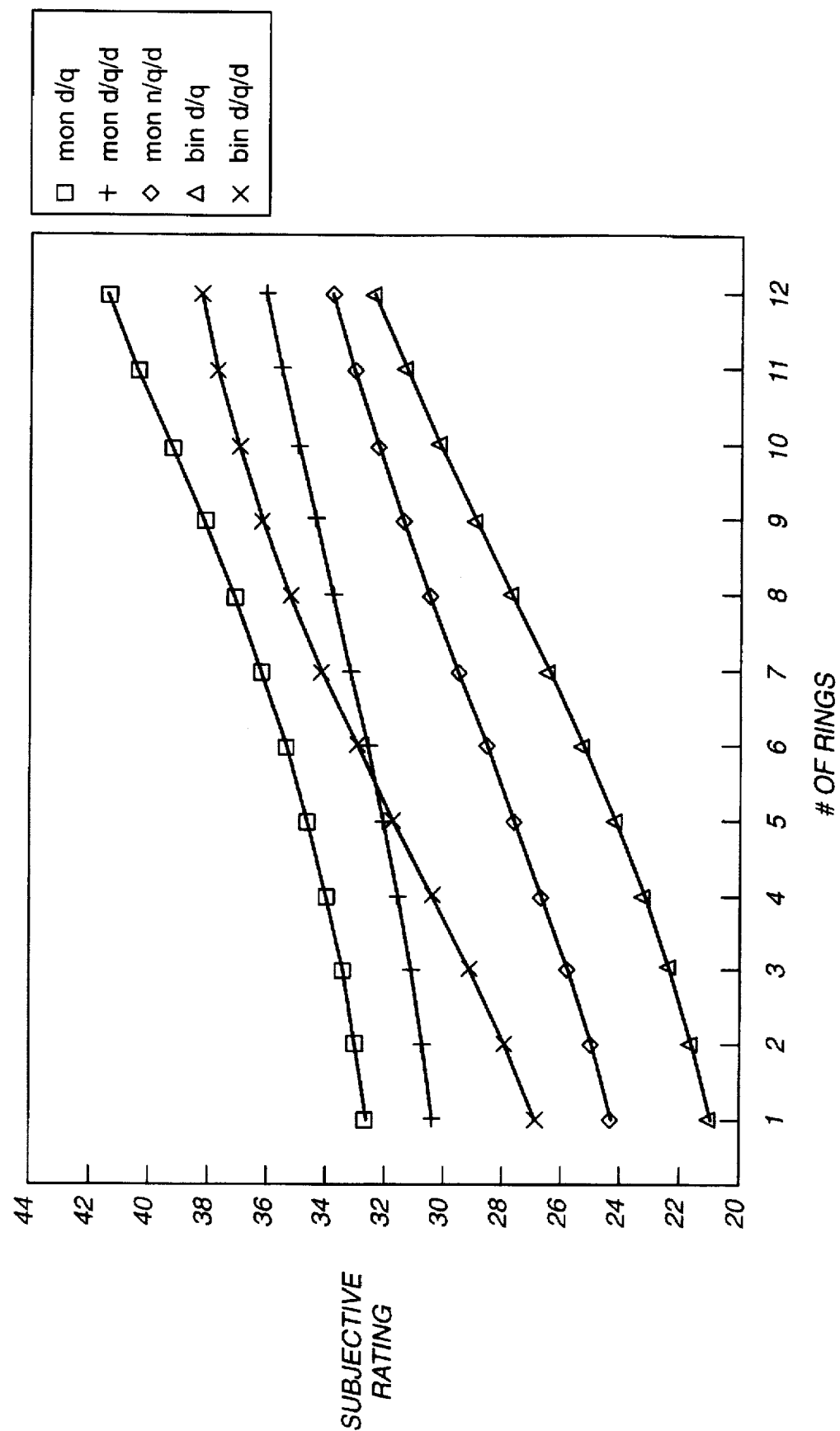
FIG. 6 shows a graph of predicted subjective near response rating plotted against number of rings for five different lens designs.

Four graphs were created (see FIGS. 3–6) for each of the following outputs:

(a) predicted actual distance VA at high luminance high contrast plotted against number of rings for the five lens designs defined above (FIG. 3);

(b) predicted subjective distance response plotted against number of rings for the five lens designs defined above (FIG. 4);

(c) predicted actual near VA at high luminance high contrast plotted against number of rings for the five lens designs defined above (FIG. 5); and (d) predicted subjective near response plotted against number of rings for the five lens designs defined above (FIG. 6).

It was then noted that in each case the subjective acuity results differed from the actual acuity results, for both distance vision and near vision. In each case, the actual acuity results indicated that a small number of rings would provide the best results, depicted as a negative slope, while the subjective results indicated a clear preference a larger number of rings, which was depicted as a positive slope. To determine the optimal number of rings, or peak value that would harmonize the conflicting results, each of the two sets of data was normalized and integrated as a composite graph, and these two composites integrations were integrated into a single composite which depicted a single optimal value for all of the integrated data sets.

This composite integration may be expressed in the following formula:

$$Qual(n) = Sub(n) \times Obj(n)$$

where

Qual is quality merit function or composite integration;

Subj is subjective response;

Obj is objectively measured response (VA); and n is the number of rings, or the clinical variation under evaluation.

Figure 7:
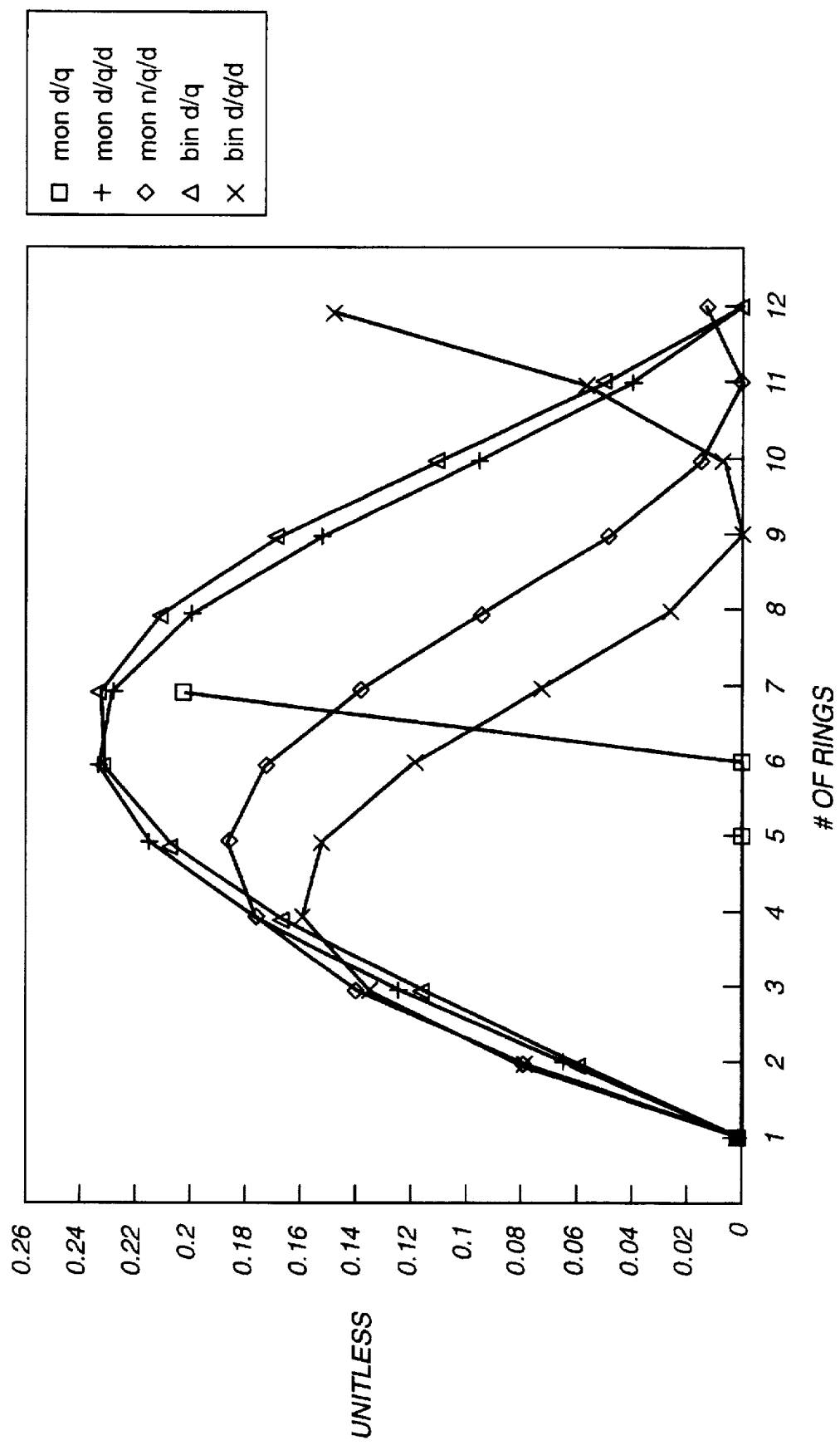
FIG. 7 shows a graph of a normalized composite of predicted distance VA and predicted subjective distance response plotted against number of rings for five different lens designs.

To create the first composite integration, the predicted actual distance VA and subjective distance response were normalized to a value of 1.0. The normalized distance VA values that corresponded to the same number of rings were multiplied by the subjective distance values and plotted against number of rings for the five lens designs defined above. The resulting graph was a distance normalized composite as shown in FIG. 7.

Figure 8:
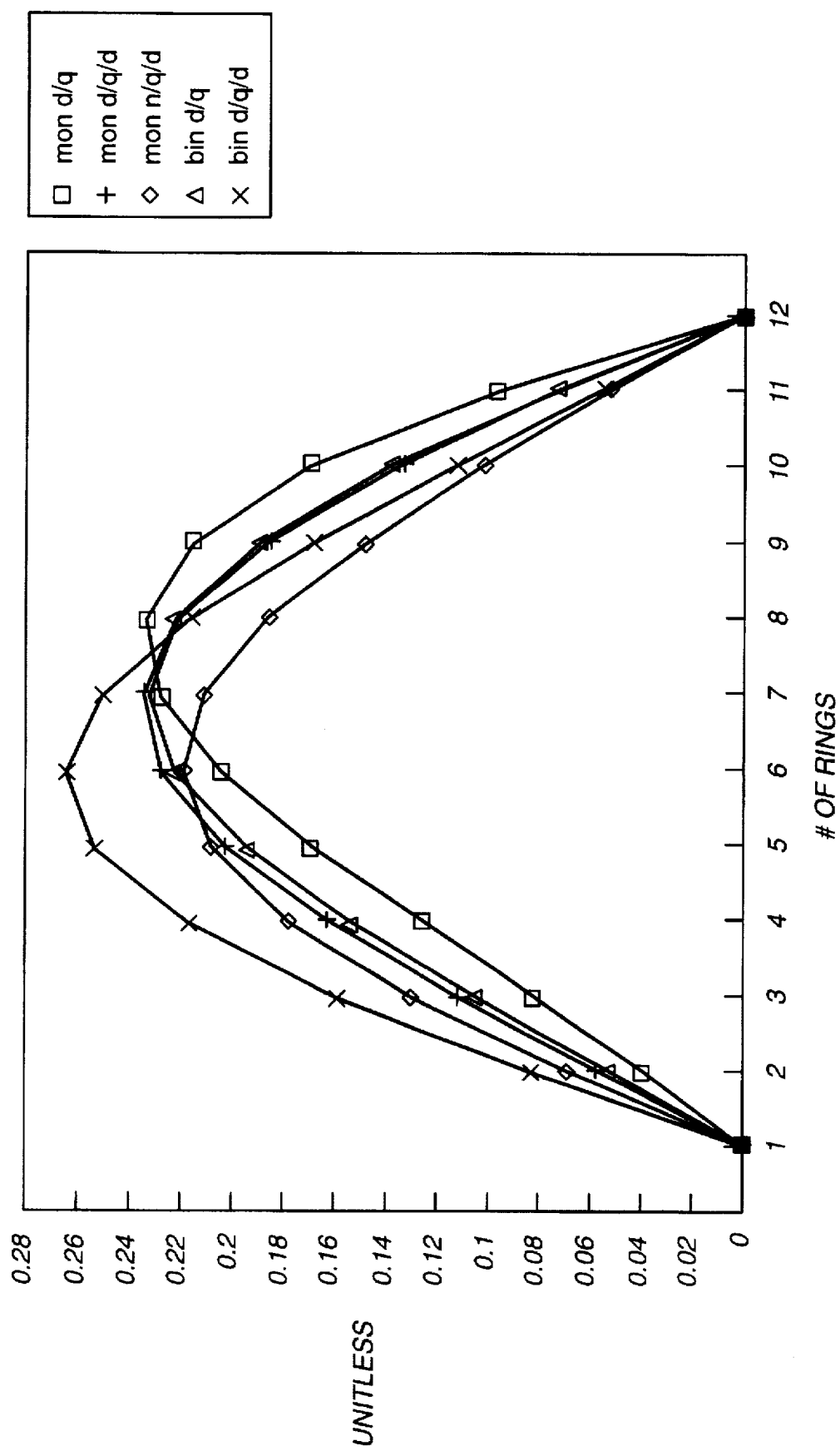
FIG. 8 shows a graph of a normalized composite of predicted near VA and subjective near response plotted against number of rings for five different lens designs.

The same integration was then preformed on the near vision data, with the predicted actual near VA and subjective near response normalized to a value of 1.0. The normalized near VA values that corresponded to the same number of rings were multiplied by the subjective near values and plotted against number of rings for the five lens designs defined above. The resulting graph was a near normalized composite as shown in FIG. 8.

Figure 9:
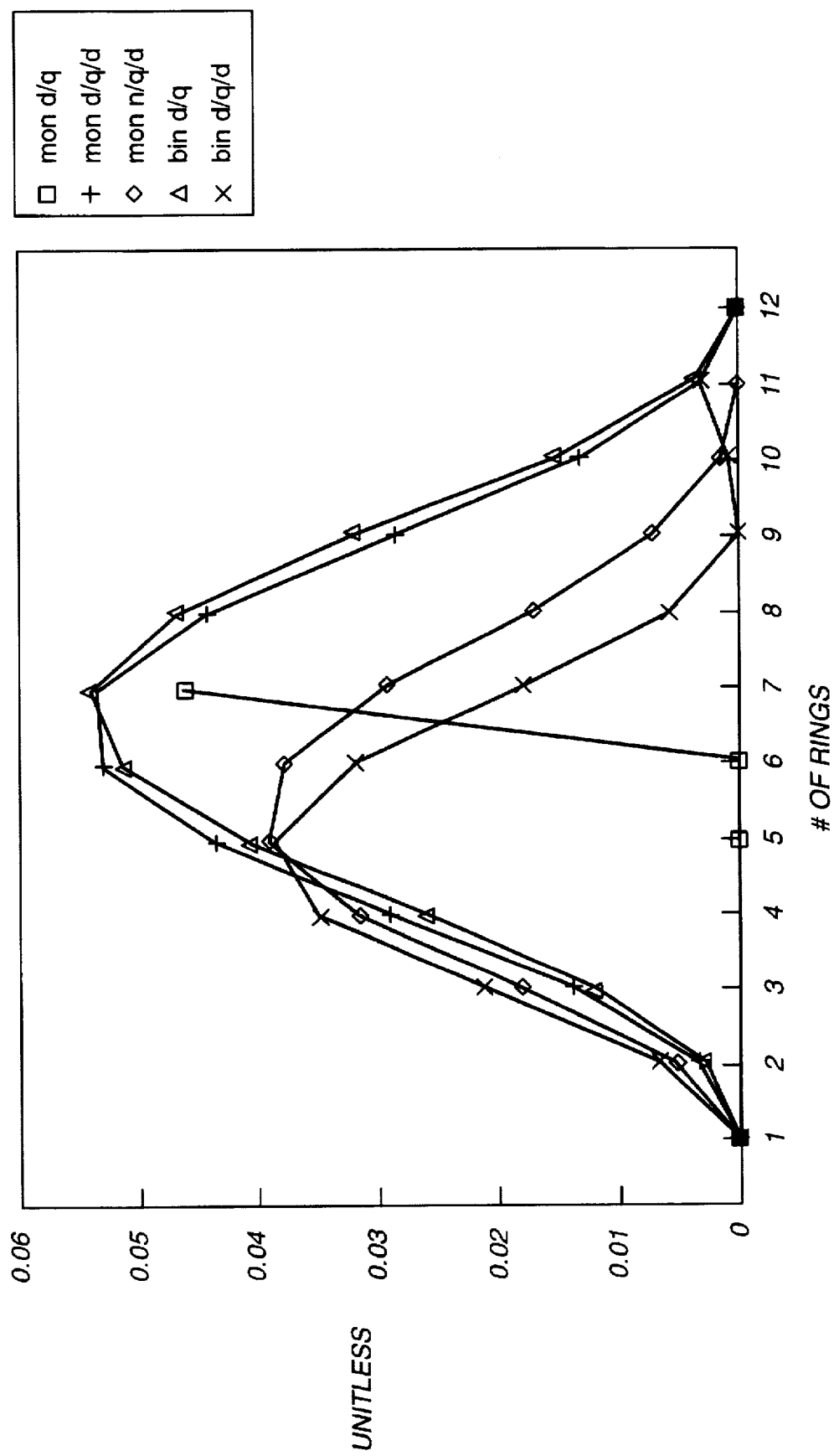
FIG. 9 shows a graph of a normalized composite of predicted near VA/subjective and distance VA/subjective plotted against number of rings for five different lens designs.

The distance normalized composite was then multiplied by the near normalized composite and the result was plotted against number of rings for the five lens designs defined above. The resulting graph was a distance/near normalized composite as shown in FIG. 9.

Figure 10:
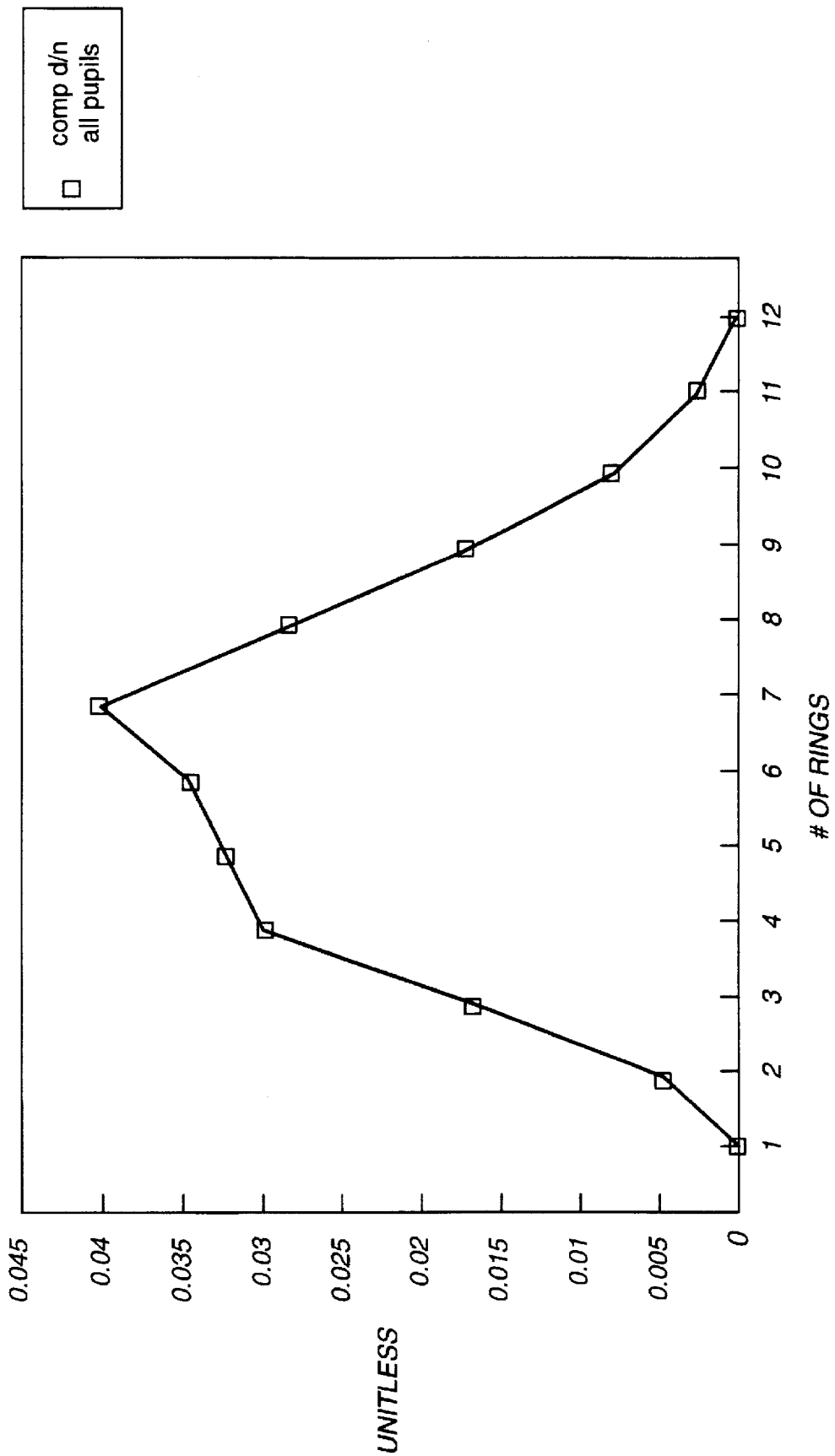
FIG. 10 shows a graph of a normalized composite of five lens designs relative to predicted VA/subjective response plotted against number of rings.

The final integration was prepared multiplying each of the resulting distance/near normalized values for each of the five lens designs and plotting them against the number of rings. The resulting graph was a distance/near normalized composite for all five lens types combined, as shown in FIG. 10. This graph represents a single function which defines the combination of all the predicted outputs for all five lens designs. This graph peaks between 5 and 7 rings. Thus, the optimal number of rings for a large population of patients having presbyopia and requiring medium refractive add correction is between 5 and 7.

This composite integration technique could be used for harmonizing or peaking disparate data sets to select any single design element that is separately tested. It could also be used if the subjective and actual results for a particular diagnostic remedy were in general harmony, as was the case with the integration of the results of FIG. 9 to the single optimzation composite illustrated in FIG. 10.

The preferred embodiment of the present inventive method described herein can be modified to determine the optimal number of rings for patients having other optical refractive conditions including, but not limited to, astigmatism and cataracts.

The preferred embodiment of the present inventive method described herein also can be modified to determine optimal values for other design parameters including, but not limited to, monocular or binocular pair and pupil function.

While the present inventive method has been described herein with respect to a preferred embodiment, it will be understood by those skilled in the art that the foregoing and other changes in form and details may be made therein without departing from the spirit and scope of the invention.

What I claim is:

1. A method of optimizing optical designs involving a plurality of design variables, said method comprising:
    (a) identifying predetermined optical design parameters relevant to a predetermined optical refractive condition;
    (b) forming optical lenses utilizing one or more of said optical design parameters for use in clinical evaluations each such evaluation providing visual acuity data and subjective response ratings for a defined number of patients having said optical refractive condition;
    (c) inputting said optical design parameters and related patient parameters as input components, and said visual acuity data and said subjective response ratings as output components into a neural network;
    (d) training said neural network to model significant relationships between said input components and said output components to thereby produce a trained neural network;
    (e) isolating and inputting one or more specific design parameters for evaluation by said trained neural network to predict visual acuity and subjective response as a function of said specific design parameter; and
    (f) integrating one or more of said predictions to determine the optimal optical design to correct said optical refractive condition.

2. The method according to claim 1, wherein said optical refractive condition is selected from a group including presbyopia and astigmatism.

3. The method according to claim 2, wherein said optical refractive condition is presbyopia.

4. The method according to claim 3, wherein said optical lenses are formed as multifocal contact lenses having a plurality of concentric annular rings with alternating distance and near add power rings.

5. The method according to claim 4, wherein said multifocal contact lenses are formed as a monocular pair or a binocular pair wherein a monocular pair comprising identical lenses, and a binocular pair comprising slightly different lenses.

6. The method according to claim 5, wherein said optical design parameters are selected from a group including:
    (a) the number of concentric annular rings;
    (b) a pupil function wherein said alternating rings are grouped into at least two regions having add power distributions defined by a pupil function type;
    (c) a lens add power; and
    (d) a monocular or binocular pair.

7. The method according to claim 6, wherein said optical design parameters include said number of concentric annular rings and said pupil functions.

8. The method according to claim 6, wherein said optical design parameters include said number of concentric annular rings, said pupil functions, said lens add power and either said monocular or said binocular pair.

9. The method according to claim 5, wherein said optical refractive condition is presbyopia, and said predicted visual acuity and said predicted subjective response is selected from a group including:
    (a) predicted distance visual acuity;
    (b) predicted near visual acuity;
    (c) predicted subjective near response;
    (d) predicted subjective distance response; and
    (e) predicted subjective overall response.

10. The method according to claim 9, wherein said predicted visual acuity include said predicted distance visual acuity and said predicted near visual acuity.

11. The method according to claim 9, wherein said predicted subjective response include said predicted subjective near response and said predicted subjective distance response.

12. The method according to claim 9, wherein said predicted visual acuity and said predicted subjective response include said predicted distance and near visual acuity and said predicted subjective distance and near response.

13. The method according to claim 12, wherein said predicted visual acuity and said predicted subjective response are normalized and combined to determine an optimum optical design for a large population of patients having said optical refractive condition.

14. The method according to claim 5, further comprising the steps of:
    grouping said input components according to said optical design parameters thereby producing a plurality of design groups; and
    averaging said input components for each of said design groups thereby obtaining average input component values.

15. The method according to claim 14, wherein said specific design parameter is the number of concentric annular rings; said number of rings being varied and input, with said average input component values, into said trained neural network for evaluation by said trained neural network; said trained neural network outputting said predicted visual acuity and said predicted subjective response as a function of said number of concentric annular rings.

16. The method according to claim 15, wherein said predicted visual acuity and said predicted subjective response is normalized and combined to determine an optimum optical design for a large population of patients having said optical refractive condition.

17. The method according to claim 5, wherein the neural network used in said inputting, training and isolating steps has an input layer having at least one input for receiving said input components and at least one hidden layer having at least one first processing element for modeling complex functions.

18. The method according to claim 17, wherein the neural network further includes an output layer having at least one second processing element, said output layer having one output for receiving said output components and for outputting said predicted visual acuity and said predicted subjective response.

19. The method according to claim 18, wherein said second processing element may be either said first processing element or a linear processing element.

20. The method according to claim 19, wherein said neural network includes said input layer, a first hidden layer, a second hidden layer and said output layer.

21. The method according to claim 20, wherein said input layer includes seven inputs, said first hidden layer includes eleven processing elements, said second hidden layer includes eight processing elements, and said output layer includes five processing elements and five outputs.

22. The method according to claim 21, wherein said optical refractive condition is presbyopia and said seven inputs are selected from a group including:

(a) the number of concentric annular rings;

(b) a pupil function;

(c) a lens add power;

(d) monocular or binocular pair;

(e) patient age;

(f) patient refractive add; and (g) Hloss.

23. The method according to claim 21, wherein said optical refractive condition is presbyopia, and said five outputs are selected from a group including:

(a) actual distance visual acuity;

(b) actual near visual acuity;

(c) subjective near response;

(d) subjective distance response; and (e) subjective overall response.

24. The method according to claim 17, wherein said neural network utilizes Talon's training algorithm which defines each of said first processing elements as a sigmoid non-linear transfer function defined by an equation as follows:

$$out = 1.0/(1+e^{-in}) - 0.5$$

where out is a processing element output, in is a processing element input and $e^{-in}$ is $1 \times 10^{-in}$.

25. The method according to claim 17, wherein said neural network is a fully connected feedforward design.

26. The method according to claim 5, wherein said optical refractive condition is presbyopia and said defined number of patients are selected from a group including:

(a) low refractive add patients;

(b) medium refractive add patients; and (c) high refractive add patients.

27. The method according to claim 26, wherein said defined number of patients are said medium refractive add patients.

28. The method according to claim 5, wherein said optical refractive condition is presbyopia, and said one or more specific design parameter is selected from a group including:

(a) the number of concentric rings;

(b) a pupil function;

(c) a lens add power; and (d) a monocular or binocular pair.

29. The method according to claim 1, wherein said patient parameters are selected from a group including:

(a) patient age;

(b) patient refractive add; and (c) Hloss.

30. The method according to claim 29, wherein said patient parameters include said patient age, said patient refractive add, and said Hloss.

31. The method according to claim 1, wherein said optical refractive condition is presbyopia.

32. The method according to claim 31, wherein said visual acuity data is obtained during a clinical evaluation which includes distance and near visual acuity at high luminance and high contrast measured in units of −10 LOG MAR, where MAR is minimum angle of resolution.

33. The method according to claim 32, wherein said visual acuity data is obtained from a clinical evaluative which includes distance and near visual acuity at high luminance and high contrast.

34. The method according to claims 32 or 33, wherein said visual acuity data is measured in lines lost from a patient's best spectacle correction.

35. The method according to claim 31, wherein said subjective response rating are obtained from a clinical evaluation which includes distance response, near response and overall response rated in unitless values from a predetermined range.

36. The method according to claim 35, wherein said subjective response ratings includes distance, near and overall subjective response ratings.

37. The method according to claim 1 which further comprises the step of testing said neural network with test data to verify that said trained neural network is valid.

38. The method according to claim 26, wherein said test data is a random 10% of said input data.

39. The method according to claim 38, wherein said specific design parameter is the number of concentric rings.

40. The method according to claim 39, wherein the number of concentric rings is varied and input into said trained neural network for evaluation, to thereby predict said visual acuity and said subject response as a function of the number of concentric rings.

* * * * *